United States Patent
Zhuo et al.

(10) Patent No.: US 12,143,996 B2
(45) Date of Patent: Nov. 12, 2024

(54) METHOD FOR DETERMINING ASSOCIATION BETWEEN LOGICAL CHANNEL GROUPS, APPARATUS, AND SYSTEM

(71) Applicant: Huawei Technologies Co., Ltd., Guangdong (CN)

(72) Inventors: Yibin Zhuo, Shenzhen (CN); Yulong Shi, Beijing (CN); Mingzeng Dai, Shenzhen (CN); Yuanping Zhu, Shanghai (CN); Jing Liu, Shanghai (CN); Zhenzhen Cao, Boulogne Billancourt (FR)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 340 days.

(21) Appl. No.: 17/670,909

(22) Filed: Feb. 14, 2022

(65) Prior Publication Data

US 2022/0167382 A1 May 26, 2022

Related U.S. Application Data

(63) Continuation of application No. PCT/CN2019/100892, filed on Aug. 15, 2019.

(51) Int. Cl.
*H04W 72/21* (2023.01)
*H04W 72/1263* (2023.01)
(Continued)

(52) U.S. Cl.
CPC ....... *H04W 72/21* (2023.01); *H04W 72/1263* (2013.01); *H04W 80/02* (2013.01); *H04W 88/14* (2013.01)

(58) Field of Classification Search
None
See application file for complete search history.

(56) References Cited

U.S. PATENT DOCUMENTS

| | | |
|---|---|---|
| 2017/0094656 A1 | 3/2017 | Chen et al. |
| 2018/0368167 A1 | 12/2018 | Kim et al. |
| 2019/0174490 A1 | 6/2019 | Dinan |

FOREIGN PATENT DOCUMENTS

CN 108632893 A 10/2018

OTHER PUBLICATIONS

ZTE, "Discussion on low latency scheduling in IAB", 3GPP TSG RAN WG2 Meeting #106, R2-1906571 (Year: 2019).*

(Continued)

*Primary Examiner* — Walter J Divito
(74) *Attorney, Agent, or Firm* — WOMBLE BOND DICKINSON (US) LLP

(57) ABSTRACT

This application provides a method of determining an association between logical channel groups, including: The first backhaul node receives a first buffer status report from a first device, where the first buffer status report is used to determine uplink buffer statuses of one or more first logical channel groups of a MAC entity corresponding to the first backhaul node and the first device. The first backhaul node determines, based on the first logical channel group(s) and a first mapping relationship, one or more second logical channel groups associated with the first logical channel group(s), where a second device is a parent node of the first backhaul node, and the first mapping relationship includes a mapping relationship between the first logical channel group(s) and the second logical channel group(s) of a MAC entity corresponding to the first backhaul node and the second device.

20 Claims, 9 Drawing Sheets

(51) Int. Cl.
*H04W 80/02* (2009.01)
*H04W 88/14* (2009.01)

(56) References Cited

OTHER PUBLICATIONS

3GPP TSG RAN WG2 Meeting #106, R2-1906571, Discussion on low latency scheduling in IAB ,ZTE Corporation, Sanechips,Reno, NV, USA, May 13 17, 2019, total 4 pages.
3GPP TSG-RAN WG2#106, R2-1906979,LCG space extension for IAB backhaul link, Huawei, HiSilicon, Reno, USA, May 13 May 17, 2019, total 2 pages.
3GPP TSG-RAN WG2 Meeting #106, R2-1906995,LCG extension, Ericsson, Reno, Nevada, US, May 13 17, 2019, total 3 pages.
ZTE Corporation et al: "Discussion on low latency scheduling in IAB", 3GPP Draft; R2-1906571,May 3, 2019, pp. 1-4, XP051710882.

\* cited by examiner

METHOD FOR DETERMINING ASSOCIATION BETWEEN LOGICAL CHANNEL GROUPS, APPARATUS, AND SYSTEM

CROSS-REFERENCE TO RELATED APPLICATIONS

This application is a continuation of International Application No. PCT/CN2019/100892, filed on Aug. 15, 2019, the disclosure of which is hereby incorporated by reference in its entirety.

TECHNICAL FIELD

Embodiments of this application relate to the field of communication technologies, and in particular, to a method for determining an association between logical channel groups, an apparatus, and a system.

BACKGROUND

With development of communication technologies, a relay networking technology is widely used and developed. A relay networking architecture is provided by using the relay networking technology. The relay networking architecture includes a donor gNodeB (DgNB), one or more relay nodes, and one or more terminals. The relay node is directly connected to the donor gNodeB or indirectly connected to the donor gNodeB through another relay node, and the terminal is connected to the donor gNodeB or the relay node through a radio air interface. In the relay networking architecture, a wireless link between the terminal and the relay node may be referred to as a wireless access link (AL). A wireless link between the relay nodes or between the relay node and the DgNB may be referred to as a wireless backhaul link (BL).

In a wireless relay networking architecture oriented to the 5th generation mobile communications (5G), both a multi-hop wireless relay scenario and a multi-connectivity scenario are supported. In a multi-hop/multi-connectivity integrated access and backhaul (IAB) networking scenario, data of a terminal may be usually transmitted, through a wireless access link, to an IAB node accessed by the terminal, so that the IAB node transmits the data to an upper-level node or a donor gNodeB.

To reduce an uplink transmission delay, a new buffer status report (BSR) type is introduced in relay networking. As shown in FIG. 1, an IAB node 01 may send a BSR 1 to an IAB node 02. The BSR 1 is used to indicate a volume of uplink data to be sent by the IAB node 01 to the IAB node 02. After receiving the BSR 1, the IAB node 02 may allocate an uplink transmission resource to the IAB node 01, and apply, in advance, for an uplink transmission resource from a parent node of the IAB node 02 (where in FIG. 1, the parent node of the IAB node 02 is a donor node) for the uplink data that is to reach the IAB node 02. In this case, when receiving the uplink data from the IAB node 01, the IAB node 02 can quickly transmit the uplink data to the parent node of the IAB node 02. Currently, BSR reporting is performed at a granularity of a logical channel group (LCG). Therefore, the BSR 1 may generally include an uplink data volume of one or more first LCGs between an IAB node (for example, the IAB node 01) and a parent node (the IAB node 02) of the IAB node. The uplink data volume of the first LCG is generally obtained by accumulating buffer information of one or more logical channels (LCHs) belonging to the first LCG.

Because the BSR 1 includes a data buffer size of each first LCG between the IAB node 01 and the IAB node 02, when a BSR 2 sent by the IAB node 02 to the donor node or the parent node of the IAB node 02 is also reported based on a granularity of an LCG (an LCG between the IAB node 02 and the parent node of the IAB node 02), if different LCHs belonging to a same first LCG are separately mapped to different second LCGs between the IAB node 02 and the parent node of the IAB node 02 when bearer mapping is performed at the IAB node 02, the IAB node 02 cannot correctly count data volumes on second LCGs between the IAB node 02 and the parent node of the IAB node 02.

SUMMARY

Embodiments of this application provide a method for determining an association between logical channel groups, an apparatus, and a system, so that a first backhaul node can accurately determine an association relationship between an LCG between the first backhaul node and a parent node and an LCG between the first backhaul node and a child node.

To achieve the foregoing objective, the embodiments of this application provide the following technical solutions.

According to a first aspect, an embodiment of this application provides a method for determining an association between logical channel groups, and the method includes: A first backhaul node receives a first buffer status report from a first device, where the first buffer status report is used to determine uplink buffer statuses of one or more first logical channel groups of a media access control MAC entity corresponding to the first backhaul node and the first device, the first device is a child node of the first backhaul node, and the first device is a terminal or a second backhaul node. The first backhaul node determines, based on the one or more first logical channel groups and a mapping relationship between the one or more first logical channel groups and one or more second logical channel groups of a MAC entity corresponding to the first backhaul node and a second device, second logical channel groups associated with the one or more first logical channel groups, where the second device is a parent node of the first backhaul node, and the second device is a donor node or a third backhaul node.

This embodiment of this application provides the method for determining an association between logical channel groups. In the method, the first backhaul node receives the first buffer status report from the first device, where the first buffer status report is used to determine the uplink buffer statuses of the one or more first logical channel groups. Because a buffer status report is reported at a granularity of a logical channel group, in this way, the first backhaul node may determine, based on the mapping relationship between the one or more first logical channel groups and the one or more second logical channel groups of the MAC entity corresponding to the first backhaul node and the second device, the second logical channel groups associated with the one or more first logical channel groups. In this way, the first backhaul node subsequently determines a buffer status of each second logical channel group in a second buffer status report based on the uplink buffer statuses of the one or more first logical channel groups and by using the logical channel group as the granularity. In addition, by determining the second buffer status report, the first backhaul node may apply for an uplink transmission resource from the second device in advance. In this way, after receiving uplink data from the first device, the first backhaul node may quickly transmit the uplink data from the first device to the second device by using the uplink transmission resource applied in advance, to reduce a transmission delay.

In an embodiment, the method provided in this embodiment of this application further includes: The first backhaul node receives a first configuration message from the donor node, where the first configuration message includes at least the mapping relationship between the one or more first logical channel groups and the one or more second logical channel groups. In this way, the first backhaul node determines the second logical channel group associated with each of the one or more first logical channel groups. Then, based on uplink buffer statuses of the first logical channel group, a buffer status of the second logical channel group associated with the first logical channel group is determined.

It should be understood that the first configuration message includes a mapping relationship between all first logical channel groups between the first backhaul node and the first device and all second logical channel groups between the first backhaul node and the second device.

In an embodiment, the method provided in this embodiment of this application further includes: The first backhaul node determines, based on the uplink buffer statuses of the one or more first logical channel groups and the mapping relationship, buffer statuses of the one or more second logical channel groups in the second buffer status report sent by the first backhaul node to the second device. The second buffer status report is used to report, to the second device, an uplink buffer status that is on the second logical channel group and that does not reach the first backhaul node.

In an embodiment, the method provided in this embodiment of this application further includes: The first backhaul node determines a scheduling request SR configuration corresponding to the second buffer status report. In this way, the second buffer status report is associated with an SR configuration with a proper timer length.

In an embodiment, the method provided in this embodiment of this application further includes: The first backhaul node determines a logical channel LCH associated with the second buffer status report. The first backhaul node determines an SR configuration associated with the LCH, and correspondingly, the scheduling request SR configuration corresponding to the second buffer status report is the SR configuration associated with the LCH. A purpose of associating an SR configuration for the second buffer status report is that when the second buffer status report is triggered but no uplink resource for transmitting the second buffer status report is available, an SR may be sent to the second device by using the SR configuration associated with the second buffer status report, to request an uplink resource for transmitting the second buffer status report.

In an embodiment, that the first backhaul node determines an LCH associated with the second buffer status report includes: The logical channel LCH associated with the second buffer status report is predefined in a protocol, or the logical channel LCH associated with the second buffer status report is preconfigured for the second buffer status report.

In an embodiment, that the first backhaul node determines an LCH associated with the second buffer status report includes: The first backhaul node determines, based on priorities of one or more LCHs, the LCH associated with the second buffer status report.

For example, the one or more LCHs belong to the one or more second logical channel groups included in the second buffer status report.

In an embodiment, the scheduling request SR configuration corresponding to the second buffer status report is predefined in a protocol, so that the first backhaul node determines, based on the predefined protocol, the SR configuration corresponding to the second buffer status report.

In an embodiment, the method provided in this embodiment of this application further includes: When the second buffer status report is triggered, the first backhaul node triggers starting of a timer. When the timer expires, the first backhaul node cancels the second buffer status report.

In an embodiment, the method provided in this embodiment of this application further includes: The first backhaul node sends the second buffer status report to the second device. The second buffer status report carries indication information. The indication information is used to indicate that the second buffer status report comes from the second backhaul node.

In an embodiment, the method provided in this embodiment of this application further includes: When the first backhaul node receives uplink data and/or the first buffer status report from the first device, the first backhaul node updates the uplink buffer statuses of the first logical channel group based on a first logical channel on which the uplink data is located and a data volume on a corresponding first logical channel group and/or the buffer status of the second logical channel group included in the first buffer status report.

According to a second aspect, an embodiment of this application provides a method for determining an association between logical channel groups, and the method includes: A donor node determines a first mapping relationship. The first mapping relationship includes: a mapping relationship between one or more first logical channel groups of a media access control MAC entity corresponding to a first backhaul node and a first device and one or more second logical channel groups of a MAC entity corresponding to the first backhaul node and a second device. The first device is a child node of the first backhaul node, and the first device is a terminal or a second backhaul node. The second device is a parent node of the first backhaul node, and the second device is the donor node or a third backhaul node. The donor node sends a first configuration message to the first backhaul node, where the first configuration message includes the first mapping relationship.

It should be understood that the first mapping relationship may be further used to determine a mapping relationship between all first logical channel groups between the first backhaul node and the first device and all second logical channel groups between the first backhaul node and the second device.

In an embodiment, the method provided in this embodiment of this application further includes: The donor node receives a second buffer status report from the first backhaul node. The second buffer status report is used to report, to the donor node, an uplink buffer status that is on the second logical channel group and that does not reach the first backhaul node.

In an embodiment, the second buffer status report carries indication information. The indication information is used to indicate that the second buffer status report comes from the second backhaul node.

According to a third aspect, this application provides an apparatus for determining an association between logical channel groups. The apparatus for determining an association between logical channel groups can implement the method in any one of the first aspect or the embodiments of the first aspect. Therefore, a beneficial effect in any one of the first aspect or the embodiments of the first aspect can also be achieved. The apparatus for determining an association between logical channel groups may be a first backhaul node, or may be an apparatus that may support a first backhaul node in implementing the method in any one of the first aspect or the embodiments of the first aspect, for example, a chip applied to the first backhaul node. The apparatus may implement the foregoing method by using software, hardware, or hardware executing corresponding software.

In an example, the apparatus for determining an association between logical channel groups includes: a communication unit, configured to receive a first buffer status report from a first device, where the first buffer status report is used to determine uplink buffer statuses of one or more first logical channel groups of a media access control MAC entity corresponding to the apparatus and the first device, the first device is a child node of the apparatus, and the first device is a terminal or a second backhaul node; and a processing unit, configured to determine, based on the one or more first logical channel groups and a mapping relationship between the one or more first logical channel groups and one or more second logical channel groups of a MAC entity corresponding to the apparatus and a second device, second logical channel groups associated with the one or more first logical channel groups, where the second device is a parent node of the apparatus, and the second device is a donor node or a third backhaul node.

In an embodiment, the communication unit is further configured to receive a first configuration message from the donor node, where the first configuration message includes at least the mapping relationship between the one or more first logical channel groups and the one or more second logical channel groups.

It should be understood that the first configuration message includes a mapping relationship between all first logical channel groups between the apparatus and the first device and all second logical channel groups between the first backhaul node and the second device.

In an embodiment, the processing unit is further configured to determine, based on the uplink buffer statuses of the one or more first logical channel groups and the mapping relationship, buffer statuses of the one or more second logical channel groups in a second buffer status report sent by the apparatus to the second device. The second buffer status report is used to report, to the second device, an uplink buffer status that is on the second logical channel group and that does not reach the apparatus.

In an embodiment, the processing unit is further configured to determine an SR configuration corresponding to the second buffer status report.

In an embodiment, the processing unit is further configured to determine an LCH associated with the second buffer status report. The processing unit is further configured to determine an SR configuration associated with the LCH, and correspondingly, the scheduling request SR configuration corresponding to the second buffer status report is the SR configuration associated with the LCH. That is, the processing unit is further configured to determine the scheduling request SR configuration corresponding to the second buffer status report. In an embodiment, the processing unit is further configured to determine the SR configuration associated with the LCH as the scheduling request SR configuration corresponding to the second buffer status report.

In an embodiment, that the processing unit is further configured to determine an LCH associated with the second buffer status report includes: The LCH associated with the second buffer status report is predefined in a protocol, or the LCH associated with the second buffer status report is preconfigured for the second buffer status report. That is, the processing unit is further configured to determine, based on the predefined protocol, the LCH associated with the second buffer status report. That is, the processing unit is further configured to determine the LCH preconfigured for the second buffer status report as the LCH associated with the second buffer status report.

In an embodiment, that the processing unit is further configured to determine an LCH associated with the second buffer status report includes: The processing unit is configured to determine, based on priorities of one or more LCHs, the LCH associated with the second buffer status report.

For example, the one or more LCHs belong to the one or more second logical channel groups included in the second buffer status report.

In an embodiment, the scheduling request SR configuration corresponding to the second buffer status report is predefined in a protocol, That is, the processing unit is further configured to determine, based on the predefined protocol, the SR configuration corresponding to the second buffer status report.

In an embodiment, when the second buffer status report is triggered, the processing unit is further configured to trigger starting of a timer. When the timer expires, the processing unit is further configured to cancel the second buffer status report.

In an embodiment, the communication unit is further configured to send the second buffer status report to the second device. The second buffer status report carries indication information. The indication information is used to indicate that the second buffer status report comes from the second backhaul node.

In an embodiment, when the communication unit receives uplink data and/or the first buffer status report from the first device, the processing unit is further configured to update an uplink buffer status of the second logical channel group based on a first logical channel on which the uplink data is located and a data volume on a corresponding first logical channel group and/or the buffer status of the first logical channel group included in the first buffer status report.

For another example, this embodiment of this application provides the apparatus for determining an association between logical channel groups. The apparatus for determining an association between logical channel groups may be the first backhaul node, or may be the chip in the first backhaul node. When the apparatus for determining an association between logical channel groups is the first backhaul node, the communication unit may be a transceiver. The processing unit may be a processor. The apparatus for determining an association between logical channel groups may further include a storage unit. The storage unit may be a memory. The storage unit is configured to store computer program code, where the computer program code includes instructions. The processing unit executes the instructions stored in the storage unit, so that the first backhaul node implements the method for determining an association between logical channel groups described in any one of the first aspect or the embodiments of the first aspect. When the apparatus for determining an association between logical channel groups is the chip in the first backhaul node, the processing unit may be a processor, and the communication unit may be collectively referred to as a communication interface. For example, the communication interface may be an input/output interface, a pin, a circuit, or the like. The processing unit executes the computer program code stored in the storage unit, so that the first backhaul node implements the method for determining an association between logical channel groups described in any one of the first aspect or the embodiments of the first aspect. The storage unit may be a storage unit (for example, a register, a cache) in the chip, or may be a storage unit (for example, a read-only memory, random access memory) outside the chip in the first backhaul node.

In an embodiment, the processor, the communication interface/the transceiver, and the memory are coupled to each other.

According to a fourth aspect, this application provides an apparatus for determining an association between logical channel groups. The apparatus for determining an association between logical channel groups can implement the method in any one of the second aspect or the embodiments of the second aspect. Therefore, a beneficial effect in any one of the second aspect or the embodiments of the second aspect can also be achieved. The apparatus for determining an association between logical channel groups may be a donor node, or may be an apparatus that may support a donor node in implementing the method in any one of the second aspect or the embodiments of the second aspect, for example, a chip applied to the donor node. The apparatus may implement the foregoing method by using software, hardware, or hardware executing corresponding software.

In an example, the apparatus for determining an association between logical channel groups includes: a processing unit, configured to determine a first mapping relationship. The first mapping relationship includes: a mapping relationship between one or more first logical channel groups of a media access control MAC entity corresponding to a first backhaul node and a first device and one or more second logical channel groups of a MAC entity corresponding to the first backhaul node and a second device. The first device is a child node of the first backhaul node, and the first device is a terminal or a second backhaul node. The second device is a parent node of the first backhaul node, and the second device is the donor node or a third backhaul node. The donor node sends a first configuration message including the first mapping relationship to the first backhaul node.

In an embodiment, the communication unit is configured to receive a second buffer status report from the first backhaul node. The second buffer status report is used to report, to the donor node, an uplink buffer status that is on the second logical channel group and that does not reach the first backhaul node.

In an embodiment, the second buffer status report carries indication information used to indicate that the second buffer status report comes from the second backhaul node.

For another example, this embodiment of this application provides the apparatus for determining an association between logical channel groups. The apparatus for determining an association between logical channel groups may be the donor node, or may be the chip in the donor node. When the apparatus for determining an association between logical channel groups is the donor node, the communication unit may be a transceiver. The processing unit may be a processor. The apparatus for determining an association between logical channel groups may further include a storage unit. The storage unit may be a memory. The storage unit is configured to store computer program code, where the computer program code includes instructions. The processing unit executes the instructions stored in the storage unit, so that the donor node implements the method for determining an association between logical channel groups described in any one of the second aspect or the embodiments of the second aspect. When the apparatus for determining an association between logical channel groups is the chip in the donor node, the processing unit may be a processor, and the communication unit may be collectively referred to as a communication interface. For example, the communication interface may be an input/output interface, a pin, a circuit, or the like. The processing unit executes the computer program code stored in the storage unit, so that the donor node implements the method for determining an association between logical channel groups described in any one of the second aspect or the embodiments of the second aspect. The storage unit may be a storage unit (for example, a register, a cache) in the chip, or may be a storage unit (for example, a read-only memory, random access memory) outside the chip in the donor node.

According to a fifth aspect, an embodiment of this application provides a computer-readable storage medium, where the computer-readable storage medium stores a computer program or instructions. When the computer program or the instructions are run on a computer, the computer is enabled to perform the method for determining an association between logical channel groups described in any one of the first aspect or the embodiments of the first aspect.

According to a sixth aspect, an embodiment of this application provides a computer-readable storage medium, where the computer-readable storage medium stores a computer program or instructions. When the computer program or the instructions are run on a computer, the computer is enabled to perform the method for determining an association between logical channel groups described in any one of the second aspect or the embodiments of the second aspect.

According to a seventh aspect, an embodiment of this application provides a computer program product including instructions. When the instructions are run on a computer, the computer is enabled to perform the method for determining an association between logical channel groups described in the first aspect or the embodiments of the first aspect.

According to an eighth aspect, this application provides a computer program product including instructions. When the instructions are run on a computer, the computer is enabled to perform the method for determining an association between logical channel groups described in the second aspect or the embodiments of the second aspect.

According to a ninth aspect, an embodiment of this application provides a communication system. The communication system includes one or more apparatuses for determining an association between logical channel groups described in the third aspect and apparatuses for determining an association between logical channel groups described in the fourth aspect.

According to a tenth aspect, an embodiment of this application provides a communication apparatus. The communication apparatus includes a processor and a storage medium, and the storage medium stores instructions. When the instructions are run by the processor, the method for determining an association between logical channel groups described in the first aspect or the embodiments of the first aspect is implemented.

According to an eleventh aspect, an embodiment of this application provides a communication apparatus. The communication apparatus includes a processor and a storage medium, and the storage medium stores instructions. When the instructions are run by the processor, the method for determining an association between logical channel groups described in the second aspect or the embodiments of the second aspect is implemented.

According to a twelfth aspect, an embodiment of this application provides a communication apparatus. The communication apparatus includes one or more modules, configured to implement the methods according to the first aspect and the second aspect, and the one or more modules may correspond to the operations in the methods according to the first aspect and the second aspect.

According to a thirteenth aspect, an embodiment of this application provides a chip. The chip includes a processor and a communication interface, the communication interface is coupled to the processor, and the processor is configured to run a computer program or instructions, to implement the method for determining an association between logical channel groups described in the first aspect or the embodiments of the first aspect. The communication interface is configured to communicate with another module outside the chip.

According to a fourteenth aspect, an embodiment of this application provides a chip. The chip includes a processor and a communication interface, the communication interface is coupled to the processor, and the processor is configured to run a computer program or instructions, to implement the method for determining an association between logical channel groups described in the second aspect or the embodiments of the second aspect. The communication interface is configured to communicate with another module outside the chip.

In an embodiment, the chip provided in this embodiment of this application further includes a memory, configured to store the computer program or the instructions.

Any apparatus, computer storage medium, computer program product, chip, or communication system provided above is configured to perform the corresponding method provided above. Therefore, for beneficial effects that can be achieved by the apparatus, computer storage medium, computer program product, chip, or communication system, refer to beneficial effects of a corresponding solution in the corresponding method provided above. Details are not described herein again.

DESCRIPTION OF EMBODIMENTS

Figure 1:
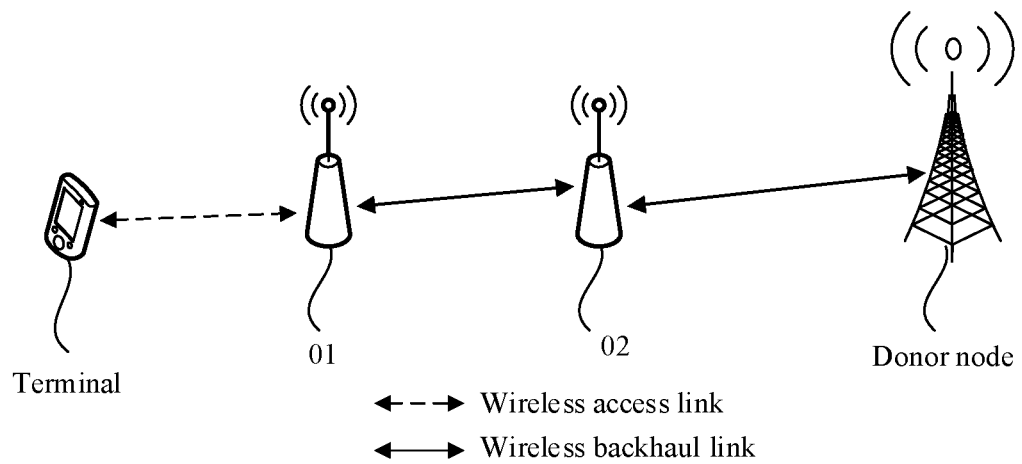
FIG. 1 is a schematic diagram of a structure of a wireless backhaul communication system according to an embodiment of this application.

To clearly describe the technical solutions in the embodiments of this application, terms such as "first" and "second" are used in the embodiments of this application to distinguish between same items or similar items that provide basically same functions and purposes. For example, a first logical channel group and a second logical channel group are merely used to distinguish different logical channel groups, and a sequence of the first logical channel group and the second logical channel group is not limited. A person skilled in the art may understand that the terms such as "first" and "second" do not limit a quantity and an execution sequence, and the terms such as "first" and "second" do not indicate a definite difference.

It should be noted that, in this application, the word such as "example" or "for example" is used to represent giving an example, an illustration, or a description. Any embodiment or design scheme described as an "example" or "for example" in this application should not be explained as being more preferred or having more advantages than another embodiment or design scheme. Exactly, use of the word "example" or "for example" or the like is intended to present a relative concept in a specific manner.

In this application, "at least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. At least one of the following items (pieces) or a similar expression thereof indicates any combination of these items, including a single item (piece) or any combination of a plurality of items (pieces). For example, at least one item (piece) of a, b, or c may indicate: a, b, c, a and b, a and c, b and c, or a, b, and c, where a, b, and c may be singular or plural.

The following describes the technical solutions of this application with reference to the accompanying drawings.

It should be understood that names of all nodes and messages in this application are merely names set for ease of description in this application, and may be different in an actual network. It should not be understood that the names of all the nodes and the messages are limited in this application, any name that has a function the same as or similar to that of the node or the message used in this application is considered as a method or an equivalent replacement in this application, and falls within the protection scope of this application. Details are not described below again.

Compared with a 4th generation mobile communication system, a 5th generation (5G) mobile communication system proposed stricter requirements on various network performance indicators in an all-round manner. For example, a capacity indicator is increased by 1000 times, wider coverage is required, and ultra-high reliability and an ultra-low latency are required. On the one hand, in view of rich frequency resources on a high frequency carrier, networking by using high-frequency small cells is increasingly popular in a hotspot area to meet an ultra-high capacity requirement of 5G. The high-frequency carrier has a poor propagation characteristic, is severely attenuated due to blocking, and has small coverage. Therefore, a large quantity of small cells need to be densely deployed. Correspondingly, it is quite costly to provide fiber backhaul for the large quantity of small cells that are densely deployed, and construction is difficult. Therefore, an economical and convenient backhaul solution is required. On the other hand, from a perspective of a wide coverage requirement, it is difficult and costly to deploy optical fibers to provide network coverage in some remote areas. Therefore, a flexible and convenient access and backhaul solution also needs to be designed.

To further reduce deployment costs and improve deployment flexibility, an integrated access and backhaul (IAB) technology is introduced in 5G. A wireless transmission solution is used in both an access link (AL) and a backhaul link (BL) in the IAB technology, so that optical fiber deployment can be avoided.

In the embodiments of this application, a node that supports integrated access and backhaul may be referred to as a wireless backhaul node (backhaul node for short). The wireless backhaul node is configured to provide a wireless backhaul service for a node (for example, a terminal) that wirelessly accesses the wireless backhaul node. The wireless backhaul service is a data and/or signaling backhaul service provided through a wireless backhaul link.

The backhaul node may also be referred to as a wireless backhaul node, a wireless backhaul device, a relay node (RN), or an IAB node. For ease of description, the IAB node is used as an example for description below. The IAB node may provide a wireless access service for a terminal, and uplink data (including, for example, uplink user plane data and uplink control plane signaling) of the terminal is transmitted to one or more IAB nodes through a wireless access link. Then, the one or more IAB nodes transmit the uplink data of the terminal or uplink data from a child node to a donor node through a wireless backhaul link. Downlink data (including downlink user plane data and downlink control plane signaling) of the terminal is sent by the donor node to the IAB node through the wireless backhaul link, and then is transmitted by the IAB node to the terminal through the wireless access link. Alternatively, downlink data of a parent node is transmitted to the IAB node through a wireless backhaul link between the parent node and the IAB node. Then, the IAB node transmits the downlink data of the parent node to a destination device (for example, a terminal or another IAB node).

The donor node is also referred to as an IAB donor, a donor node, or a donor gNodeB. The following embodiments are described by using the donor node as an example. In a 4G network, the donor node may be a donor evolved NodeB (DeNB). In a 5G network, the donor node may be a donor next generation NodeB (DgNB).

In a current 5G standard, considering that a high frequency band has a small coverage area, multi-hop networking may be used in an IAB network to ensure coverage performance of a network. In consideration of a service transmission reliability requirement, the IAB node may be enabled to support multi-connectivity, to cope with an exception that may occur on a backhaul link, for example, an exception such as a link outage or a link blockage and load fluctuation, thereby enhancing transmission reliability assurance. The multi-connectivity may be dual connectivity (DC), or may be at least two connections. This is not limited in the embodiments of this application.

The IAB network supports multi-hop networking and multi-connectivity networking. Therefore, there may be a plurality of transmission paths between the terminal and the donor node. On one path, there is a determined hierarchical relationship between IAB nodes and between an IAB node and a donor node that serves the IAB node. In the embodiments of this application, each IAB node considers a node that provides a wireless access and backhaul service for the IAB node as a parent node. Correspondingly, each IAB node may be considered as a child node of the parent node of the IAB node. In other words, a parent node of an IAB node is a next-hop node of the IAB node on an uplink or a previous-hop node on a downlink of the IAB node. A child node of an IAB node is a previous-hop node of the IAB node on an uplink or a next-hop node on a downlink of the IAB node. Therefore, in the embodiments of this application, from a perspective of downlink transmission, the parent node of the IAB node is also referred to as an upper-level device/node of the IAB node, and the child node of the IAB node is also referred to as a lower-level device/node of the IAB node.

For example, as shown in FIG. 1, from a perspective of downlink transmission, a parent node of an IAB node 01 is an IAB node 02, that is, the IAB node 01 is a child node of the IAB node 02. A child node of a donor node is the IAB node 02, that is, a parent node of the IAB node 02 is the donor node.

It should be noted that a communication system applicable to the embodiments of this application includes but is not limited to a narrowband Internet of Things (NB-IoT) system, a wireless local area network (WLAN) system, an LTE system, a next-generation 5G mobile communication system, or a communication system after 5G, for example, a new radio (NR) system.

Figure 2:
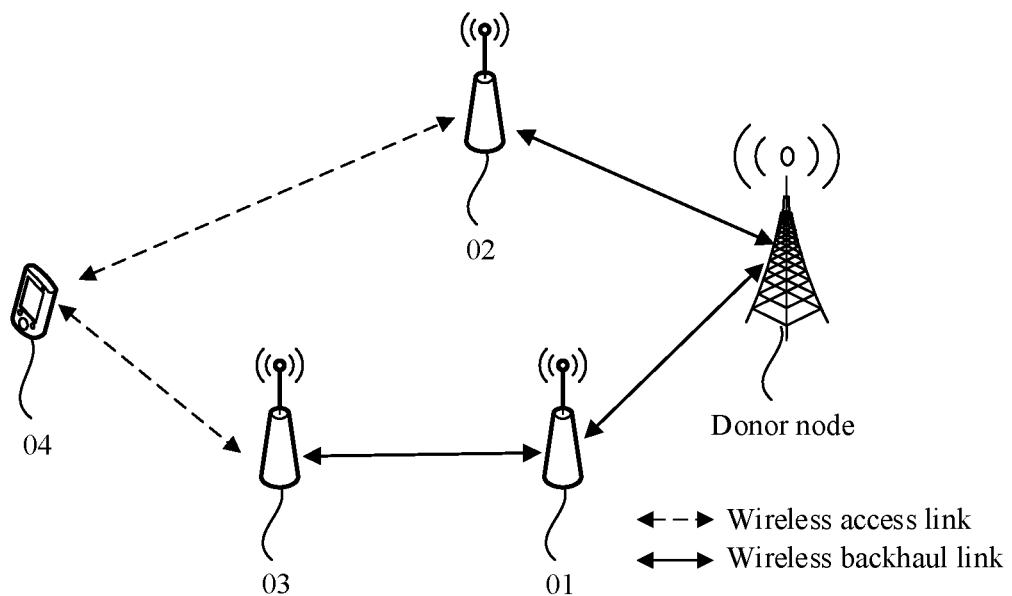
FIG. 2 is a schematic diagram of a structure of another wireless backhaul communication system according to an embodiment of this application.
Figure 3:
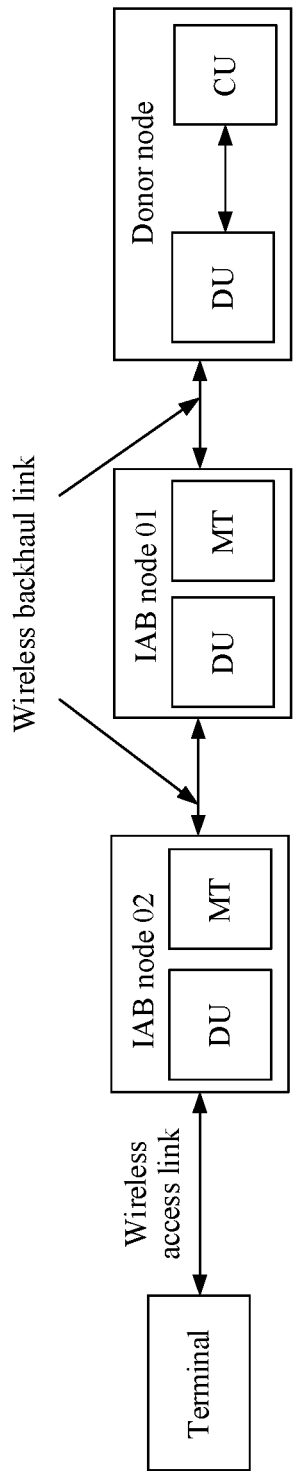
FIG. 3 is a schematic diagram of a structure of still another wireless backhaul communication system according to an embodiment of this application.

To better understand the method and apparatus for determining an association between logical channel groups in a wireless backhaul network in the embodiments of this application, the following first describes a communication system to which the embodiments of this application are applied. Refer to FIG. 1, FIG. 2, and FIG. 3. FIG. 1 is a schematic diagram of a communication system to which an embodiment of this application is applied. FIG. 2 is a schematic diagram of another communication system to which an embodiment of this application is applied. FIG. 3 is a schematic diagram of still another communication system to which an embodiment of this application is applied.

As shown in FIG. 2, the communication system shown in FIG. 2 is a wireless backhaul communication system. The wireless backhaul communication system includes a donor node, one or more IAB nodes (for example, an IAB node 01, an IAB node 02, and an IAB node 03), and at least one terminal (for example, a terminal 04 served by the IAB node 03 and the IAB node 02). A parent node of the IAB node 01 and the IAB node 02 are donor nodes. The IAB node 01 is a parent node of the IAB node 03.

The terminal 04 is connected to the IAB node 03 and the IAB node 02 in a wireless manner, and is connected to the donor node through one or more IAB nodes (for example, the IAB node 02, or the IAB node 03 and the IAB node 01). Certainly, the terminal 04 or another terminal in the wireless backhaul communication system may also be directly connected to the donor node.

In an embodiment, the communication system shown in FIG. 2 may further include a core network device. The donor node is connected, through a wireless link or a wired link, to a core network device serving the terminal 04, for example, a core network device that is connected to a 5G core (5GC) network or a 4G core network (for example, an evolved packet core (EPC) network) and that provides a backhaul service for one or more IAB nodes or the terminal 04.

The core network device and the donor node may be different independent physical devices. Alternatively, a function of the core network device and a logical function of the donor node may be integrated into a same physical device, or some functions of the core network device and some functions of the donor node may be integrated into one physical device. A location of at least one terminal may be fixed or mobile. FIG. 2 is merely a schematic diagram. The wireless backhaul communication system may further include another network device. A quantity of core network devices, donor nodes, IAB nodes, and terminals that are included in the wireless backhaul communication system is not limited in this embodiment of this application.

An uplink data packet of the terminal 04 may be transmitted to the donor node through one or more IAB nodes, and then sent by the donor node to a core network. A downlink data packet is received by the donor node from the core network, and then is sent to the terminal 04 through one or more IAB nodes between the donor node and the terminal 04.

In FIG. 2, there are two available paths for data transmission between the terminal 04 and the donor node: Path 1: the terminal 04 ←→ the IAB node 02 ←→ the donor node. Path 2: the terminal 04 ←→ the IAB node 03 ←→ the IAB node 01 ←→ the donor node.

In this embodiment of this application, there is a wireless access link between any terminal and an IAB node accessed by the terminal. For example, there is a wireless access link between the terminal 04 and the IAB node 02. There is a wireless access link between the terminal 04 and the IAB node 03.

The wireless access link is a wireless link used for communication between a terminal and a node (for example, an IAB node, a donor node, or a distributed unit (DU) of a donor node) that provides an access service for the terminal, and includes an uplink transmission link and a downlink transmission link Uplink transmission on the wireless access link is also referred to as uplink transmission on an access link, and downlink transmission on the wireless access link is also referred to as downlink transmission on an access link.

In this embodiment of this application, there is a wireless backhaul link between any IAB node and a parent node of the IAB node. For example, there is a wireless backhaul link between the IAB node 03 and the IAB node 01. There is a wireless backhaul link between the IAB node 01 and the donor node.

The wireless backhaul link is a wireless link used for communication between a wireless backhaul node and another wireless backhaul node or a donor node, and includes an uplink transmission link and a downlink transmission link. Uplink transmission on the wireless backhaul link is also referred to as uplink transmission on a backhaul link, and downlink transmission on the wireless backhaul link is also referred to as downlink transmission on a backhaul link. The wireless backhaul node includes but is not limited to the foregoing IAB node.

Communication between an IAB node and a terminal and communication between terminals may be performed by using a licensed spectrum, or may be performed by using an unlicensed spectrum, or may be performed by using both the licensed spectrum and the unlicensed spectrum. Communication between the IAB node 02 and the terminal 04 and communication between the terminals may be performed by using a spectrum below 6 gigahertz (GHz), or may be performed by using a spectrum above 6 GHz, or may be performed by using both a spectrum below 6 GHz and a spectrum above 6 GHz. A spectrum resource used by the wireless access link and the wireless backhaul link is not limited in this embodiment of this application.

A base station (for example, a gNB) may use a CU-DU split architecture, that is, one gNB includes one centralized unit (CU) of the gNB and one or more DUs of the gNB. The CU of the gNB is connected to the DU of the gNB through an F1 interface, and the CU of the gNB is connected to a core network 5GC through an NG interface. In a scenario in which the terminal directly accesses the base station, the terminal accesses a gNB-CU by using the DU of the gNB, that is, a PHY/MAC/RLC layer function corresponding to the terminal is located on the DU of the gNB. A PDCP/SDAP/RRC layer function corresponding to the terminal is located on the CU of the gNB.

When the IAB node uses a split architecture, as shown in FIG. 3, the IAB node includes two parts: a mobile termination (MT) of the IAB node and a DU of the IAB node. For the IAB node, the DU of the IAB node is similar to the DU of the gNB, and is configured to provide an access service for a child node (for example, a terminal or another IAB node) of the IAB node, that is, a function of a Uu interface. For example, the DU may provide a wireless connection function for the terminal or a lower-level IAB node. The MT of the IAB node is similar to the terminal, and is configured to provide data backhaul for a child node of the DU of the IAB node, and send data of the child node of the DU of the IAB node back to the donor node. In a scenario in which the terminal accesses the IAB node, a PHY/MAC/RLC layer function corresponding to the terminal is located on a DU of the IAB node accessed by the terminal. A PDCP/SDAP/RRC layer function corresponding to the terminal is located on the CU of the IAB node accessed by the terminal. When the IAB node is oriented to a parent node of the IAB node, the IAB node may be considered as a terminal, that is, a role of the MT. When the IAB node is oriented to a child node (where the child node may be another IAB node or a terminal that accesses the IAB node) of the IAB node, the IAB node may be considered as an access device, that is, a role of the DU.

For the donor node, a DU of the donor node is also similar to the DU of the gNB, and is configured to provide an access service for a child node (for example, a terminal or an IAB node) of the DU of the donor node. A CU of the donor node is similar to a gNB-CU, and is configured to control all IAB nodes and terminals of the CU of the donor node.

It should be understood that if the donor node includes the DU and the CU, and the IAB node includes the MT or the DU, as shown in FIG. 3, a wireless access link may be a link between the terminal and a DU of the IAB node 02. The wireless backhaul link may be a link between an MT of the IAB node 02 and a DU of a parent node (for example, the IAB node 01) of the IAB node 02.

For ease of description, a centralized unit of the donor node is briefly referred to as a donor CU (or directly referred to as a CU), and a distributed unit of the donor node is briefly referred to as a donor DU. The donor CU may alternatively be in a form in which a control plane (CP) is separated from a user plane (UP), for example, the CU may include one CU-CP and one CU-UP (or more CU-UPs).

An F1AP message is a control plane message of an interface between a CU and a DU. In a possible IAB scenario, the CU is used as a part of the donor node, and the DU is used as a part of the IAB node. There may be a communication interface between the CU and the DU of the IAB node, that is, an F1 interface (or an F1* interface). The F1 interface includes a user plane and a control plane, and an application protocol layer of the control plane is an F1AP (F1 application Protocol) protocol layer. A control plane message on the F1 interface between the CU and the IAB node is referred to as the F1AP message, and may be used to manage the F1 interface, configure the DU of the IAB node, transmit a radio resource control (RRC) message of a terminal, and the like.

In an embodiment, when an MT part of an IAB node initiates access to a parent node of the IAB node, the IAB node or the MT part of the IAB node may also be considered by the parent node (or an upper-level node) as a terminal accessing the parent node.

In this embodiment of this application, any IAB node has one or more first logical channel groups and one or more second logical channel groups. The one or more first logical channel groups of the IAB node are logical channel groups of a child node of the IAB node (which may also be referred to as one or more first logical channel groups of a MAC entity corresponding to the IAB node and the child node). Alternatively, the one or more first logical channel groups of the IAB node are logical channel groups on a DU side of the IAB node. One or more second logical channel groups of any IAB node are logical channel groups between the IAB node and a parent node. Alternatively, one or more second logical channel groups of any IAB node are logical channel groups of an MT side of the IAB node, or may be referred to as one or more second logical channel groups of a MAC entity corresponding to the IAB node and a parent node. Any logical channel group may include one or more logical channels (LCHs).

The IAB networks shown in FIG. 1 to FIG. 3 are merely examples. In an IAB scenario in which multi-hop and multi-connectivity are combined, there are more other possibilities. For example, a donor node and an IAB node connected to another donor node form dual connectivity to serve a terminal. The possibilities are not listed one by one herein.

In this embodiment of this application, the donor node may be an access device used by the terminal or the IAB node to access a wireless relay communication system in a wireless manner. The donor node may include but is not limited to a base station (NB), an evolved NodeB (eNodeB), a next generation NodeB (gNB) in a 5G wireless relay communication system, a base station in a future wireless relay communication system, an access node in a wireless fidelity (Wi-Fi) system, and the like. A specific technology and a specific device form used by the donor node are not limited in this embodiment of this application.

It should be understood that the gNB may access a 5GC through an NG interface. The eNB may access an EPC network through an S1 interface.

The terminal is a device that provides voice and/or data connectivity for a user, for example, a handheld device or a vehicle-mounted device with a wireless connection function. The terminal may also be referred to as user equipment (UE), an access terminal, a user unit, a user station, a mobile station, a mobile console, a remote station, a remote terminal, mobile equipment, a user terminal, wireless telecom equipment, a user agent, user equipment, or a user apparatus. The terminal may be a station (STA) in a wireless local area network (WLAN), or may be a cellular phone, a cordless phone, a session initiation protocol (SIP) phone, a wireless local loop (WLL) station, a personal digital assistant (PDA) device, a handheld device with a wireless communication function, a computing device or another processing device connected to a wireless modem, a vehicle-mounted device, a wearable device, a terminal in a next-generation communication system (for example, a 5G communication network), a terminal in a future evolved public land mobile network (PLMN) network, or the like. 5G may also be referred to as new radio (NR).

For example, in the embodiments of this application, the terminal may alternatively be a wearable device. The wearable device may also be referred to as a wearable intelligent device, and is a general term of a wearable device that is intelligently designed and developed for daily wear by using a wearable technology, for example, glasses, gloves, a watch, clothing, and shoes. The wearable device is a portable device that can be directly worn by a user or integrated into clothes or an accessory of the user. The wearable device is not merely a hardware device, but is used to implement a powerful function through software support, a data exchange, and cloud interaction. Generalized wearable intelligent devices include full-featured and large-size devices that can implement complete or partial functions without depending on smartphones, such as smartwatches or smart glasses, and devices that focus on only one type of application function and need to work with other devices such as smartphones, such as various smart bands or smart jewelry for monitoring physical signs.

It should be understood that the radio access network device and the terminal may be deployed on land, including an indoor or outdoor device and terminal, a handheld device and terminal, or a vehicle-mounted device and terminal, may be deployed on water, or may be deployed on an airplane, a balloon, and a satellite in the air. An application scenario of the radio access network device and the terminal is not limited in this embodiment of this application.

Figure 4:
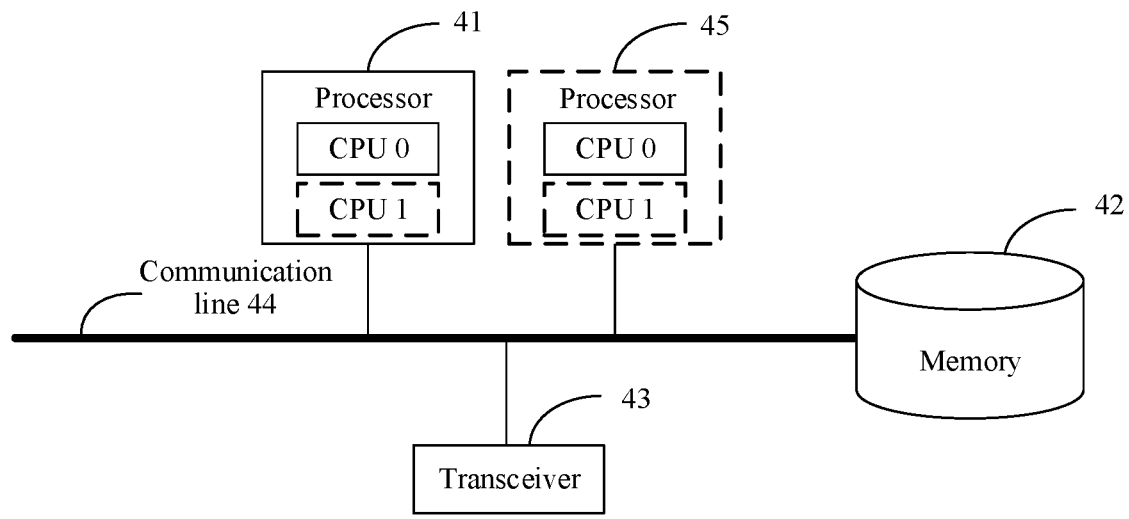
FIG. 4 is a schematic diagram of a structure of a communication device according to an embodiment of this application.

FIG. 4 is a schematic diagram of a hardware structure of a communication device according to an embodiment of this application. For hardware structures of the first device, the second device, the first backhaul node, and the donor node in the embodiments of this application, refer to the schematic diagram of the hardware structure of the communication device shown in FIG. 4. The communication device includes a processor 41, a communication line 44, and at least one communication interface (where a transceiver 43 in FIG. 4 is used as an example for description).

The processor 41 may be a general-purpose central processing unit (CPU), a microprocessor, an application-specific integrated circuit (ASIC), or one or more integrated circuits configured to control program execution of the solutions of this application.

The communication line 44 may include a path for transferring information between the foregoing components.

The transceiver 43 is configured to communicate, by using any apparatus such as a transceiver, with another device or a communication network such as the Ethernet, a radio access network (RAN), or a wireless local area network (WLAN).

In an embodiment, the communication device may further include a memory 42.

The memory 42 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer, but is not limited thereto. The memory may exist independently, and is connected to the processor through the communication line 44. The memory may alternatively be integrated with the processor.

The memory 42 is configured to store computer-executable instructions for executing the solutions of this application, and the processor 41 controls the execution. The processor 41 is configured to execute the computer-executable instructions stored in the memory 42, to implement a policy control method provided in the following embodiments of this application.

In an embodiment, the computer-executable instructions in this embodiment of this application may also be referred to as application program code. This is not limited in this embodiment of this application.

In an embodiment, the processor 41 may include one or more CPUs, for example, a CPU 0 and a CPU 1 in FIG. 4.

In an embodiment, the communication device may include a plurality of processors, such as the processor 41 and a processor 45 in FIG. 4. Each of the processors may be a single-core processor, or may be a multi-core processor. The processor herein may be one or more devices, circuits, and/or processing cores configured to process data (for example, computer program instructions).

In a process of air interface uplink transmission between a base station and a terminal, the terminal is triggered to send a BSR to the base station in one of the following cases.

Case 1: There is (to-be-transmitted) new uplink data on a logical channel (LCH) belonging to a logical channel group (LCG), and a priority of the logical channel is higher than a priority of a logical channel in any current logical channel group, or there is no to-be-transmitted uplink data on all logical channels in a current logical channel group. A BSR triggered in this case is referred to as a regular BSR.

Case 2: A retransmission timer (retxBSR-Timer) expires, and the terminal has to-be-transmitted uplink data on any logical channel in a logical channel group. A BSR triggered in this case is referred to as a regular BSR.

Case 3: A periodic BSR timer (periodicBSR-Timer) expires. A triggered BSR may be referred to as a periodic BSR.

Case 4: An uplink resource is allocated, and a quantity of padding bits (padding bits) is greater than or equal to a sum of bits of a BSR MAC CE and a MAC subheader of the BSR MAC CE. Such a BSR is referred to as a padding BSR.

The terminal may report the BSR to the base station, so that the base station schedules a proper uplink transmission resource to the terminal based on the BSR. When the regular BSR is triggered, but there is no uplink resource for transmitting the regular BSR, the terminal sends a scheduling request (SR) to the base station to request an uplink resource for transmitting the regular BSR.

Currently, the BSR is reported by using a media access control control element (MAC CE) at a media access control (MAC) layer, and the BSR is reported at an LCG granularity. A plurality of logical channels may be allocated to one terminal, and each logical channel has a corresponding data radio bearer (DRB).

When configuring the logical channel, the base station specifies an LCG to which the LCH belongs. When the terminal reports the BSR, the terminal accumulates buffer information of a plurality of LCHs that belong to a same LCG to generate a BSR of the LCG. Further, the terminal may be configured with a plurality of LCGs. Correspondingly, the BSR reported by the terminal may include buffer sizes of one or more LCGs, and has two types of MAC CE formats.

Figure 5A:
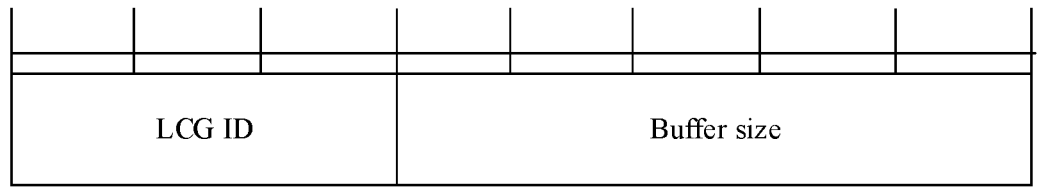
FIG. 5a is a MAC CE format for reporting a BSR according to an embodiment of this application.

A first type includes a short BSR MAC CE format and a short truncated BSR MAC CE format, which is shown in FIG. 5a. The short BSR MAC CE format and the short truncated BSR MAC CE format include an LCG ID (an ID of an LCG that needs to be reported) and a buffer size. The BSR MAC CE format of the first type is used to report a quantity of uplink resources of an LCG.

A second type includes a long BSR MAC CE format and a long truncated BSR MAC CE format. The long BSR MAC CE format and the long truncated BSR MAC CE format include eight LCGi and one or more buffer sizes. The LCGi is used to indicate whether a buffer size field corresponding to the $i^{th}$ LCG in the long BSR exists (where 1 indicates that the buffer size field exists, and a corresponding buffer size is reported). For the long truncated BSR, the LCGi is used to indicate whether available uplink data exists in the $it^h$ LCG (where 1 indicates that the available uplink data exists).

When a regular BSR is triggered and there is no uplink resource for transmitting the BSR, the terminal triggers an SR to apply for an uplink resource. In an NR protocol, each MAC entity may be configured with a plurality of SR configurations. Each SR configuration may be associated with one or more LCHs, and each LCH may be associated with zero SR configurations or one SR configuration. Therefore, if a regular BSR is triggered due to data on each LCH, an SR configuration of an SR triggered by the regular BSR is an SR configuration associated with the LCH.

The SR configuration in the embodiments of this application may include any one or more of the following parameters: an SR prohibit timer, a maximum quantity of SR transmissions, an SR configuration identifier, an SR transmission resource, a periodicity of an SR transmission resource, and an offset of an SR transmission resource. For the following content related to the SR configuration, refer to the description herein. Details are not described subsequently again.

The following describes in detail a communication method provided in the embodiments of this application with reference to FIG. 6 to FIG. 11.

An embodiment of this application provides a method for determining an association between logical channel groups. The method for determining an association between logical channel groups may be performed by a first device or a chip applied to the first device. The method for determining an association between logical channel groups may be performed by a second device or a first backhaul node, or a chip applied to the second device or a chip applied to the first backhaul node. Examples in which the method for determining an association between logical channel groups is performed by the first device, the second device, and the first backhaul node are used in the following embodiments.

Figure 6:
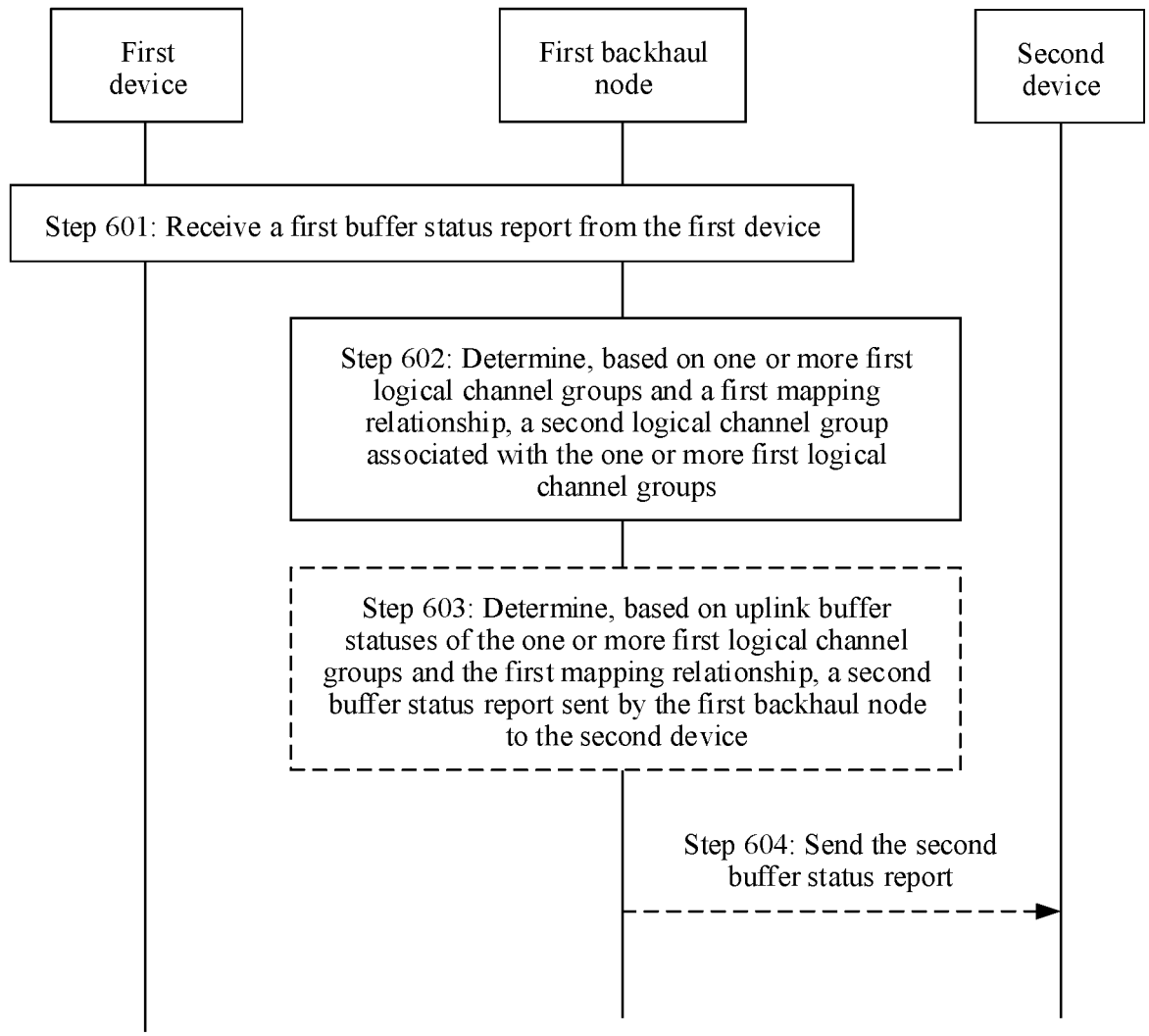
FIG. 6 is a schematic flowchart of a method for determining an association between logical channel groups according to an embodiment of this application.

FIG. 6 is a schematic flowchart of a method for determining an association between logical channel groups according to an embodiment of this application. The method may be applied to the communication systems shown in FIG. 1 to FIG. 3. However, this embodiment of this application is not limited thereto. As shown in FIG. 6, the method includes the following operations.

Operation 601: A first backhaul node receives a first buffer status report from a first device. The first buffer status report is used to determine uplink buffer statuses of one or more first logical channel groups of a media access control MAC entity corresponding to the first backhaul node and the first device. The first device is a child node of the first backhaul node, and the first device is a terminal or a second backhaul node.

The terminal in this embodiment of this application is a terminal serving the first backhaul node.

For example, as shown in FIG. 3, the first backhaul node is an IAB node 03, and the first device is a terminal 04. For example, the first backhaul node is an IAB node 01, and the first device is an IAB node 03.

The uplink buffer status in this embodiment of this application may have the following definition: a data buffer size, a buffer size, there is a data buffer size, or there is no data buffer size.

The buffer size in this embodiment of this application may also be referred to as a buffer size. The buffer size in this embodiment of this application may be a specific value, or may be a range value. Certainly, the buffer size may alternatively be represented by a percentage, a buffer level, or the like.

In an embodiment, in this embodiment of this application, the first buffer status report may be used to reflect an uplink buffer size at the first device.

For example, as shown in FIG. 2, the IAB node 03 may report, to the IAB node 01, an uplink buffer size in the IAB node 03. The uplink buffer size at the first device is an uplink data volume buffered at the first device.

The uplink buffer size at the first device may be mapped to the one or more first logical channel groups. That is, a sum of data buffer sizes reflected by the uplink buffer statuses of the one or more first logical channel groups is equal to the uplink buffer size at the first device. For example, if the uplink buffer size at the first device is 10 M, a sum of data buffer sizes reflected by uplink buffer statuses of all first logical channel groups in the one or more first logical channel groups is 10 M.

The one or more first logical channel groups may be all logical channel groups of the MAC entity corresponding to the first backhaul node and the first device. Alternatively, the one or more first logical channel groups may be some of all logical channel groups of the MAC entity corresponding to the first backhaul node and the first device.

For example, the first buffer status report includes identifiers of the one or more first logical channel groups and an uplink buffer status corresponding to each of the one or more first logical channel groups.

Operation 602: The first backhaul node determines, based on the one or more first logical channel groups and a first mapping relationship, second logical channel groups associated with the one or more first logical channel groups. The second device is a parent node of the first backhaul node, and the second device is a donor node or a third backhaul node. The first mapping relationship includes a mapping relationship between the one or more first logical channel groups and the one or more second logical channel groups. The second logical channel group is a logical channel group of a MAC entity corresponding to the first backhaul node and the second device.

For example, as shown in FIG. 2, the first backhaul node is the IAB node 03, and the second device may be the IAB node 01 (that is, the third backhaul node). For example, the first backhaul node is the IAB node 01, and the second device may be the donor node.

In this embodiment of this application, the first backhaul node has the first mapping relationship. In an embodiment, the first backhaul node has the mapping relationship between the one or more first logical channel groups and the one or more second logical channel groups. That is, there is a mapping relationship between each of the first logical channel groups and one of the one or more second logical channel groups.

For example, as shown in FIG. 2, if the one or more first logical channel groups included in the first buffer status report include an LCG 11, an LCG 12, an LCG 13, and an LCG 14, the one or more second logical channel groups include an LCG 21, an LCG 22, and an LCG 23. If the first mapping relationship at the first backhaul node includes at least a mapping relationship between the LCG 11 and the LCG 21, a mapping relationship between the LCG 12 and the LCG 21, a mapping relationship between the LCG 13 and the LCG 22, and a mapping relationship between the LCG 14 and the LCG 22, the first backhaul node may determine that a second logical channel group associated with the LCG 11 is the LCG 21, a second logical channel group associated with the LCG 12 is the LCG 21, a second logical channel group associated with the LCG 13 is the LCG 22, and a second logical channel group associated with the LCG 14 is the LCG 22.

In an optional implementation, the first mapping relationship may be obtained by using a configuration message sent by the donor node or a CU unit of the donor node. The configuration message includes the mapping relationship.

In another optional implementation, the first mapping relationship may be predefined and obtained from a protocol, that is, the second logical channel groups to which the one or more first logical channel groups are mapped are second logical channel groups that are not associated with any LCHs.

In still another optional implementation, the first mapping relationship may be implicitly obtained. It is assumed that a mapping relationship between a first logical channel group and a second logical channel group used to report a locally buffered uplink data volume is known. Therefore, only with a mapping relationship between the second logical channel group used to report the locally buffered uplink data volume and a second logical channel group used to report a data volume that is to reach/does not reach being determined, a mapping relationship between the first logical channel group and the second logical channel group used to report the data volume that is to reach/does not reach can be determined.

For example, the mapping relationship between the first logical channel group and the second logical channel group used to report the data volume that is to reach/does not reach may be configured by the donor node or predefined in a protocol. A manner of predefining the mapping relationship is that a second $LCG_i$ is associated with a second $LCG_{(i+N/2)}$. i indicates a number of a second LCG, where $1 \le i \le N$, and N indicates a quantity of second LCGs.

Example 1: The MAC entity corresponding to the first backhaul node and the second device includes six second LCGs, for example, a second LCG 1, a second LCG 2, a second LCG 3, a second LCG 4, a second LCG 5, and a second LCG 6. In this case, the second LCG 1, the second LCG 2, and the second LCG 3 are used to report the locally buffered uplink data volume, and the second LCG 4, the second LCG 5, and the second LCG 6 are used to report the data volume that is to reach/does not reach. The second LCG 1 is associated with the second LCG 4, the second LCG 2 is associated with the second LCG 5, and the second LCG 3 is associated with the second LCG 6.

In this embodiment of this application, the second logical channel groups associated with the one or more first logical channel groups may be all second logical channel groups of the MAC entity corresponding to the first backhaul node and the second device, or may be some of all second logical channel groups.

This embodiment of this application provides the method for determining an association between logical channel groups. In the method, the first backhaul node receives the first buffer status report from the first device, where the first buffer status report is used to determine the uplink buffer statuses of the one or more first logical channel groups. Because a buffer status report is reported at a granularity of a logical channel group, the first backhaul node may determine, based on the mapping relationship between the one or more first logical channel groups and the one or more second logical channel groups, the second logical channel groups associated with the one or more first logical channel groups. In this way, the first backhaul node subsequently determines a buffer status of each second logical channel group in a second buffer status report based on the uplink buffer statuses of the one or more first logical channel groups. In addition, by determining the second buffer status report, the first backhaul node may apply for an uplink transmission resource from the second device in advance. In this way, after receiving uplink data from the first device, the first backhaul node may transmit the uplink data from the first device to the second device in time by using the uplink transmission resource applied in advance, to reduce a transmission delay.

Still with reference to FIG. 6, the method for determining an association between logical channel groups provided in this embodiment of this application further includes the following operation.

Operation 603: The first backhaul node determines, based on the uplink buffer statuses of the one or more first logical channel groups and the first mapping relationship, the second buffer status report sent by the first backhaul node to the second device. The second buffer status report includes the one or more second logical channel groups associated with the one or more first logical channel groups. The second buffer status report is used to report, to the second device, an uplink buffer status that is on the second logical channel group and that does not reach the first backhaul node.

For example, the second buffer status report includes an identifier of each logical channel group in one or more second logical channel groups and an uplink buffer status corresponding to the logical channel group.

In this embodiment of this application, the second buffer status report may be further used to reflect an uplink buffer size in the first backhaul node.

In an embodiment, in this embodiment of this application, when the second buffer status report is used to reflect the uplink buffer size in the first backhaul node, a second logical channel group to which the uplink buffer size in the first backhaul node is mapped is different from a second logical channel group to which the uplink buffer status that does not reach the first backhaul node is mapped. For example, the second logical channel group to which the uplink buffer size in the first backhaul node is mapped is the LCG 23 and the LCG 24, and the second logical channel group to which the uplink buffer status that does not reach the first backhaul node is mapped is the LCG 21 and the LCG 22.

With reference to the above example, if the LCG 21 is associated with the LCG 11 and the LCG 21 is associated with the LCG 12, a buffer size reflected by an uplink buffer status of the LCG 21 includes at least a sum of a buffer size reflected by an uplink buffer status of the LCG 11 and a buffer size reflected by an uplink buffer status of the LCG 12.

Certainly, in addition to the buffer statuses of the second logical channel groups associated with the one or more first logical channel groups in the first buffer status report, the second buffer status report may further include buffer statuses of second logical channel groups that are not associated with the one or more first logical channel groups.

Because the second buffer status report may include a sum of uplink data of a plurality of child nodes or terminals, a reported data volume included in the second buffer status report may include the plurality of child nodes or terminals.

In an embodiment, after operation 603, the method provided in this embodiment of this application may further include the following operation.

Operation 604: The first backhaul node sends the second buffer status report to the second device. The second buffer status report carries indication information. Correspondingly, the second device may receive the second buffer status report from the second device. The indication information is used to indicate that the second buffer status report comes from the second backhaul node.

Alternatively, the indication information indicates that the second buffer status report comes from the terminal.

It should be noted that, if there is an uplink resource that meets a sending condition, a group includes a MAC PDU of a BSR MAC CE corresponding to the second buffer status report, and sends the MAC PDU.

Figure 5B:
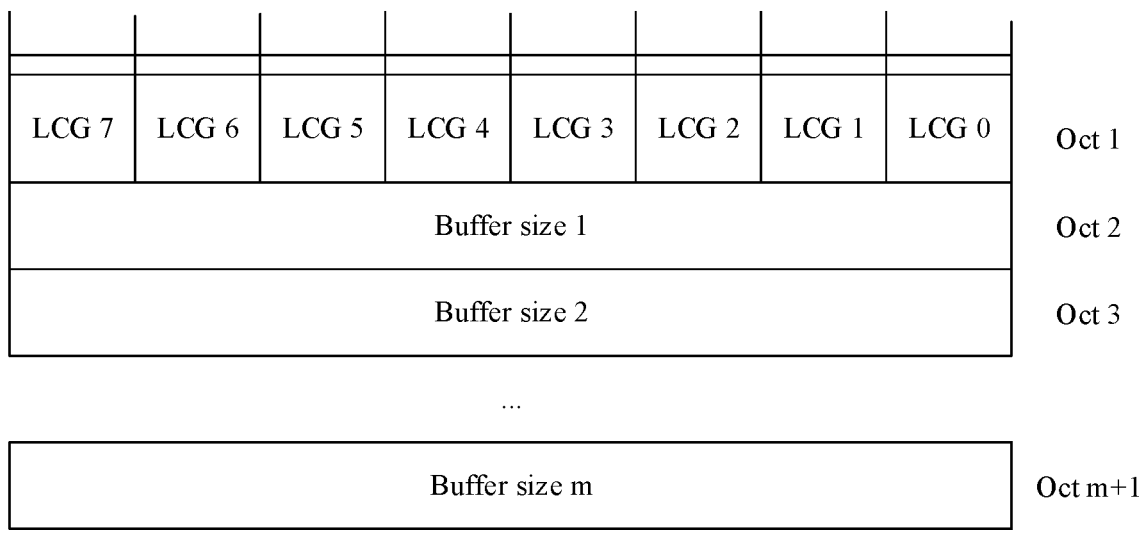
FIG. 5b is another MAC CE format for reporting a BSR according to an embodiment of this application.

If the second buffer status report is sent by reusing the BSR MAC CE shown in FIG. 5a or FIG. 5b, when receiving the second buffer status report from the first backhaul node, the second device needs to distinguish the BSR MAC CE from a normal BSR MAC CE sent by the terminal, so that the second device performs optimal scheduling. Therefore, the indication information may be added to the sent second buffer status report, to indicate whether the second buffer status report comes from the terminal or the second backhaul node, or to indicate whether the second buffer status report includes uplink data that does not reach.

Operation 603 in this embodiment of this application may be independently implemented, or may be implemented in combination with operation 601 and operation 602. When operation 603 is independently implemented, the first backhaul node has the first mapping relationship and the uplink buffer statuses of the one or more first logical channel groups.

Figure 7:
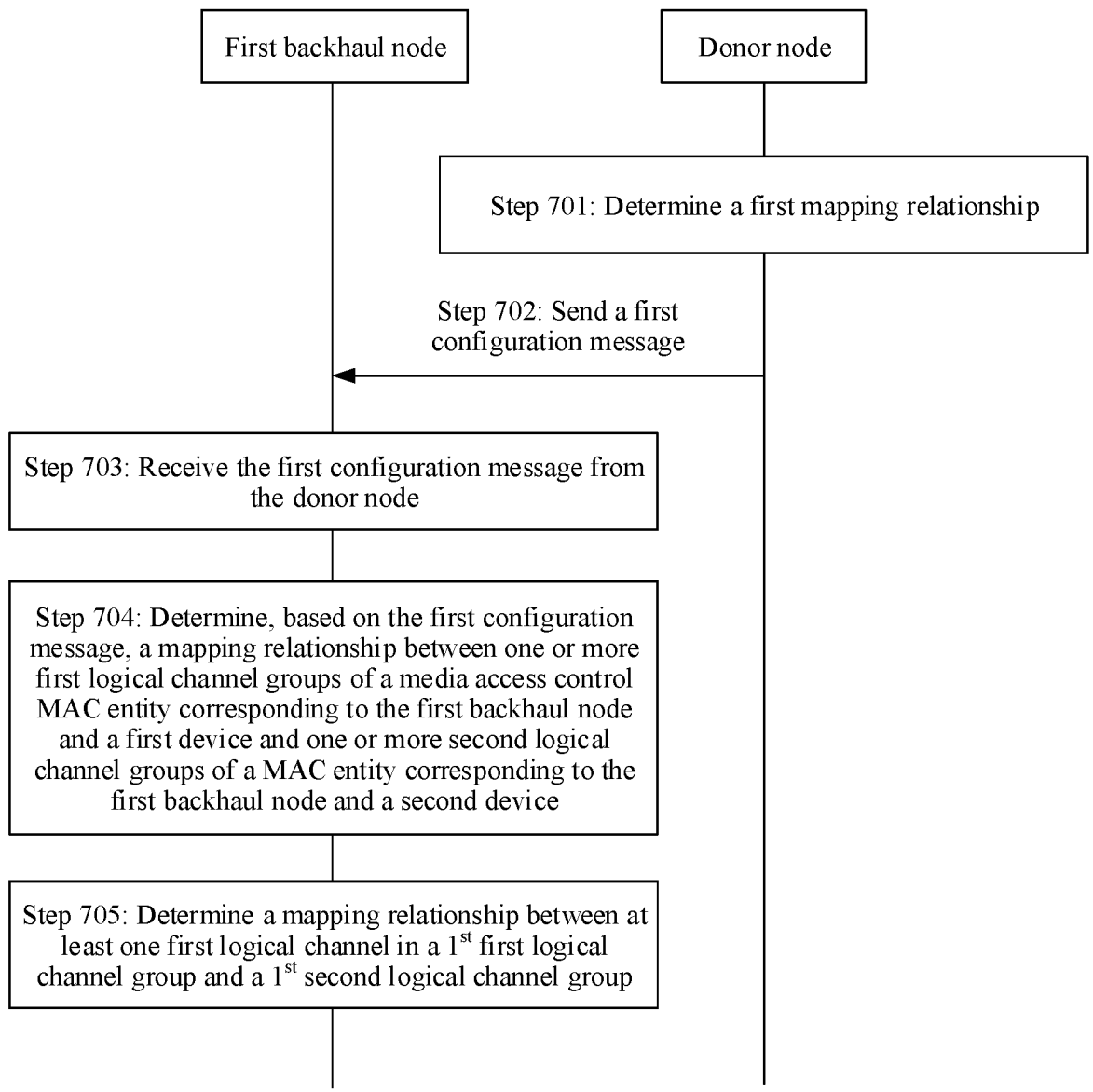
FIG. 7 is a schematic flowchart of another method for determining an association between logical channel groups according to an embodiment of this application.
Figure 8:
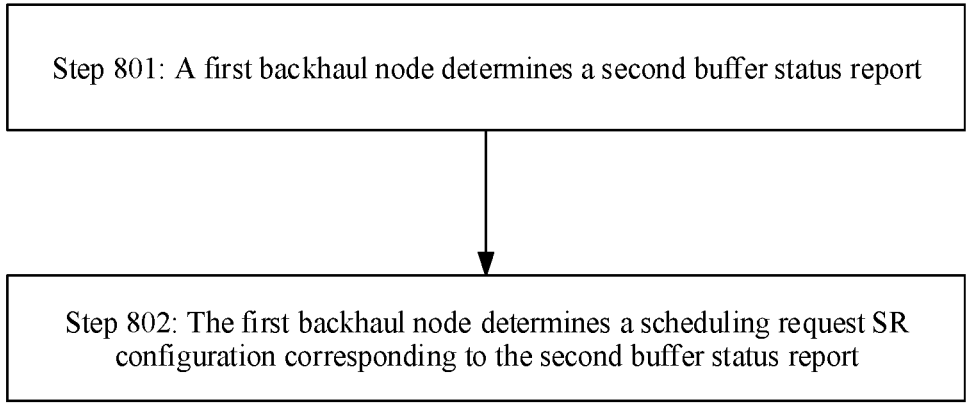
FIG. 8 is a schematic flowchart of determining an SR configuration for a BSR according to an embodiment of this application.

As shown in FIG. 7, an embodiment of this application provides a method for configuring a mapping relationship between logical channel groups, and the method includes the following operations.

Operation 701: A donor node determines a first mapping relationship. The first mapping relationship includes a mapping relationship between one or more first logical channel groups of a MAC entity corresponding to a first backhaul node and a first device and one or more second logical channel groups of a MAC entity corresponding to the first backhaul node and a second device.

The mapping relationship between the one or more first logical channel groups and the one or more second logical channel groups may be that each of the one or more first logical channel groups is associated with one of the one or more second logical channel groups, or each of the one or more second logical channel groups is associated with one of the one or more first logical channel groups. It should be understood that two or more first logical channel groups may be associated with a same second logical channel group.

Operation 702: The donor node sends a first configuration message to the first backhaul node, where the first configuration message includes the first mapping relationship.

It should be understood that if there is another backhaul node between the first backhaul node and the donor node or a CU of the donor node, the donor node or the CU of the donor node sends the first configuration message to the another backhaul node, so that the another backhaul node forwards the first configuration message to the first backhaul node hop by hop.

It should be understood that, in this embodiment of this application, the donor node may actively send the first configuration message to the first backhaul node. Alternatively, after receiving a request sent by the first backhaul node, the donor node may send the first configuration message to the first backhaul node.

Operation 703: The first backhaul node receives the first configuration message from the donor node.

Operation 704: The first backhaul node determines, based on the first configuration message, the mapping relationship between the one or more first logical channel groups of the MAC entity corresponding to the first backhaul node and the first device and the one or more second logical channel groups of the MAC entity corresponding to the first backhaul node and the second device.

It should be noted that, in this embodiment of this application, operation 701 to operation 704 may be independently implemented. Certainly, operation 701 to operation 704 may also be implemented in combination with operation 601 to operation 604. When operation 701 to operation 704 are implemented in combination with operation 601 to operation 604, operation 701 to operation 704 are performed at least before operation 602.

To implement feasibility of the foregoing configuration, if there is a mapping relationship between the first LCG and the second LCG, during bearer mapping, there is a mapping relationship between one or more first LCHs belonging to a same first LCG and one or more second LCHs of a second LCG associated with the first LCG. That is, if the first backhaul node determines that the mapping relationship exists between the first LCG and the second LCG, the first backhaul node may also determine that a mapping relationship exists between one or more first LCHs belonging to the first LCG and the second LCG.

In an optional embodiment of this application, as shown in FIG. 7, the method provided in this embodiment of this application further includes the following operation.

Operation 705: The first backhaul node determines a mapping relationship between at least one first logical channel in a 1' first logical channel group and a 1' second logical channel group.

The $1^{st}$ first logical channel group is any one of the one or more first logical channel groups. The $1^{st}$ second logical channel group is a second logical channel group that is associated with the $1^{st}$ first logical channel group and that is in the one or more second logical channel groups. A manner and a principle of determining a mapping relationship between at least one first logical channel in any one of the one or more first logical channel groups and the second logical channel group are the same as a manner and a principle of determining the mapping relationship between the at least one first logical channel in the $1^{st}$ first logical channel group and the $1^{st}$ second logical channel group. Therefore, the $1^{st}$ first logical channel group is used as an example in operation 705.

It should be understood that if the first backhaul node is configured with an association between the $1^{st}$ first logical channel group and the $1^{st}$ second logical channel group, the first backhaul node determines that there is the mapping relationship between the at least one first logical channel in the $1^{st}$ first logical channel group and the $1^{st}$ second logical channel group. Alternatively, if the donor node configures an association relationship between the $1^{st}$ first logical channel group and the $1^{st}$ second logical channel group for the first backhaul node, the donor node may further configure the mapping relationship between the at least one first logical channel in the 1st first logical channel group and the $1^{st}$ second logical channel group for the first backhaul node.

It should be noted that, by performing operation 705, the first backhaul node can determine that at least one first logical channel belonging to a same first logical channel group has an association relationship with a second logical channel group associated with the first logical channel group.

It should be understood that a mapping relationship between at least one first logical channel in any first logical channel group and the second logical channel group includes a mapping relationship between the at least one first logical channel in the first logical channel group and at least one second logical channel in the second logical channel group.

In this embodiment of this application, there is a mapping relationship between at least one first LCH belonging to one first logical channel group and a second LCG associated with the first logical channel group. In an embodiment, there is a mapping relationship between the at least one first LCH belonging to the first logical channel group and one or more second LCHs in the second LCG associated with the first logical channel group. That is, there is a mapping relationship between each of at least one first LCH belonging to a same first LCG and one of one or more second LCHs in a second LCG associated with the first LCG.

For example, a first LCH 11, a first LCH 12, and a first LCH 13 belong to a first LCG 1, and a second LCH 21 and a second LCH 22 belong to a second LCG 2. If there is a mapping relationship between the first LCG 1 and the second LCG 2, a mapping relationship between the first LCH 11 and the second LCH 21 may be configured, a mapping relationship between the first LCH 12 and the second LCH 21 may be configured, and a mapping relationship between the first LCH 13 and the second LCH 22 may be configured.

Manner 1: If a mapping relationship between a logical channel and a logical channel group to which the logical channel belongs is generated and configured by the donor node, the donor node determines a mapping relationship between a first logical channel group and a second logical channel group based on the mapping relationship between the logical channel and the logical channel group to which the logical channel belongs. For example, if there is a mapping relationship between an LCH 11 belonging to an LCG 11 and an LCH 22 belonging to an LCG 2, the donor node may determine that there is a mapping relationship between an LCG 21 and the LCG 11.

Manner 2: If a CU-DU architecture is still used, a mapping relationship between an LCG and an LCH that are between a DU and a terminal is generated and sent by the DU to a CU, and finally the CU notifies the terminal of the mapping relationship. In an IAB scenario, an IAB node (a DU connected to a child node) generates the configuration and notifies a CU of a donor node of the configuration, and then notifies a child node MT or a terminal of the configuration through configuration information. In this case, it needs to specify that when generating a configuration relationship between the DU of the IAB node and the child node/terminal, the DU of the IAB node needs to consider a mapping relationship between an MT side of the IAB node and a parent node, a mapping relationship between LCGs of two adjacent hops, and a bearer mapping relationship between the two adjacent hops. For example, an LCG 1 and an LCG 2 are mapped to an LCG 1'. If the LCG 1' includes an LCH 1', an LCH 2', an LCH 3', and an LCH 4', and an LCH 1 and an LCH 2 included in the LCG 1 and an LCH 3 and an LCH 4 included in the LCG 2 are respectively mapped to the LCH 1', the LCH 2', the LCH 3', and the LCH 4', when the IAB node generates a mapping relationship between an LCG and an LCH, it needs to specify that an LCG corresponding to the LCH 1, the LCH 2, the LCH 3, and the LCH 4 can only be the LCG 1 or the LCG 2.

In an embodiment, when an LCG used for a second buffer status report that is used to reflect an uplink data buffer size in the first backhaul node and an LCG used for a second buffer status report that is used to reflect an uplink data volume that is to reach the first backhaul node are reused, the donor node only needs to configure one mapping relationship. When an LCG used for a second buffer status report that is used to reflect an uplink data buffer size in the first backhaul node and an LCG used for a second buffer status report that is used to reflect an uplink data volume that is to reach the first backhaul node are independent, mapping relationships between the two LCGs need to be configured separately.

In an embodiment, a mapping relationship between LCGs of two adjacent hops may be configured based on each link (based on the IAB node and each child node or the terminal), or may be configured based on each IAB node (where for the IAB node, a configuration of the IAB node is the same as configurations of all child nodes or terminals, and this case should be feasible only when the CU performs unified coordination in the case of Manner 1).

When a triggered second buffer status report is a regular BSR and there is no uplink resource for transmitting the second buffer status report, the first backhaul node triggers an SR application to apply for an uplink resource for transmitting the second buffer status report. When the second buffer status report is used to report, to the second device, an uplink buffer status that is on the second logical channel group and that does not reach the first backhaul node, that is, the second buffer status report triggered by the first backhaul node is used to report an uplink data volume that does not reach the first backhaul node, with reference to FIG. 8, in still another embodiment of this application, a method provided in this embodiment of this application includes the following operations.

Operation 801: A first backhaul node determines a second buffer status report. The second buffer status report is used to report, to a second device, an uplink buffer status that is on a second logical channel group and that does not reach the first backhaul node.

As an example, for an embodiment of operation 801, refer to the embodiment of operation 603.

Operation 802: The first backhaul node determines a scheduling request SR configuration corresponding to the second buffer status report.

In a first possible implementation, operation 802 in this embodiment of this application may be implemented in the following manner: The first backhaul node determines an LCH associated with or corresponding to the second buffer status report, and the first backhaul node determines an SR configuration associated with or corresponding to the LCH. Correspondingly, the scheduling request SR configuration corresponding to the second buffer status report is an SR configuration associated with the LCH associated with the second buffer status report. That is, the first backhaul node determines the SR configuration associated with the LCH as an SR configuration associated with the second buffer status report.

For example, if the LCH associated with the second buffer status report is an LCHn, and the LCHn is associated with an SR configuration 1, the SR configuration 1 is the SR configuration corresponding to the second buffer status report.

In this embodiment of this application, the first backhaul node may determine the LCH associated with the second buffer status report in the following manners.

Manner A: The logical channel LCH associated with the second buffer status report is predefined in a protocol. Alternatively, the logical channel LCH associated with the second buffer status report is preconfigured for the second buffer status report. That is, the first backhaul node determines, based on the predefined protocol or a configuration, the LCH associated with the second buffer status report.

Manner B: The first backhaul node determines, based on priorities of one or more LCHs, the LCH associated with the second buffer status report.

For example, a protocol predefines that one or more LCHs associated with the second buffer status report is an LCH included in the one or more LCHs. For example, the protocol predefines that the LCH associated with the second buffer status report is an LCH with the highest priority in LCHs with data or without data. Alternatively, the protocol predefines that the LCH associated with the second buffer status report is an LCH with the lowest priority in LCHs with data or without data.

In a second possible implementation, operation 802 in this embodiment of this application may be implemented in the following manner: The first backhaul node determines, based on the predefined protocol, the SR configuration corresponding to the second buffer status report. That is, the scheduling request SR configuration corresponding to the second buffer status report is predefined in a protocol.

A difference between the second possible implementation and the first possible implementation lies in that, in the second possible implementation, an association relationship between the second buffer status report and the SR configuration is more directly predefined in the protocol or configured.

In this embodiment of this application, the second buffer status report is associated with the SR configuration. In this way, when the second buffer status report is triggered but no uplink resource for transmitting the second buffer status report is available, an SR may be sent to the second device by using the SR configuration associated with the second buffer status report, to request an uplink resource for transmitting the second buffer status report.

It should be noted that, in this embodiment of this application, operation 801 and operation 802 may be independently implemented. Certainly, operation 801 and operation 802 may also be implemented in combination with operation 601 to operation 604 and operation 701 to operation 704. When operation 801 and operation 802 are implemented in combination with operation 701 to operation 704 and operation 601 to operation 604, operation 801 and operation 802 are performed at least after operation 603.

Figure 9:
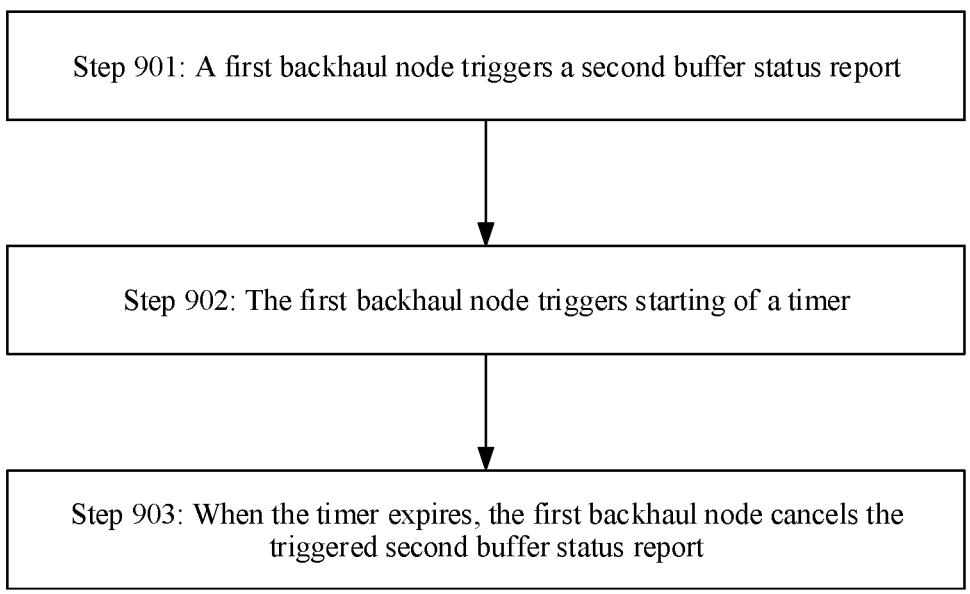
FIG. 9 is a schematic flowchart of canceling a triggered BSR according to an embodiment of this application.

With reference to FIG. 9, in still another embodiment of this application, a method provided in this embodiment of this application includes the following operations.

Operation 901: A first backhaul node triggers a second buffer status report. The second buffer status report is used to report, to a second device, an uplink buffer status that is on a second logical channel group and that does not reach the first backhaul node.

For example, in this embodiment of this application, the first backhaul node may trigger the second buffer status report based on the following trigger conditions.

For example, the trigger condition includes any one or more of the following conditions.

Condition 1: The first backhaul node triggers the second buffer status report based on a first buffer status report received from a first device. The first buffer status report is used to reflect an uplink buffer size at the first device, or the first buffer status report is used to reflect an uplink data volume that is to reach a first buffer node.

Condition 2: The first backhaul node triggers the second buffer status report based on a UL grant sent to a first device.

Condition 3: The first backhaul node triggers the second buffer status report based on indication information, where the indication information is used to indicate to trigger the second buffer status report.

Condition 4: The first backhaul node triggers the second buffer status report when a data buffer size in the first backhaul node or an uplink data volume that is to reach/does not reach the first backhaul node reaches a specific threshold. Certainly, there may further be another trigger condition in this embodiment of this application.

When the triggered second buffer status report is an advance report of the uplink data volume that is to reach the first backhaul node, and uplink data included in the second buffer status report reaches the first backhaul node, the second buffer status report may not need to be sent for the uplink data. Instead, a BSR used to reflect an uplink buffer size at the first device is used to report the uplink data volume. In addition, k1 information included in the UL grant used by the first backhaul node to perform uplink scheduling for the first device indicates a time point at which uplink data of the first device reaches the first backhaul node.

Operation 902: When the second buffer status report is triggered, the first backhaul node triggers starting of a timer.

It may be understood that the second buffer status report is associated with the timer.

Operation 903: When the timer expires, the first backhaul node cancels the triggered second buffer status report.

It may be understood that, if the timer expires, and a buffer status report triggered by the first backhaul node further includes, in addition to the second buffer status report, the BSR used to reflect the uplink buffer size at the first device, or another BSR, the first backhaul node may also cancel the BSR used to reflect the uplink buffer size at the first device, or the another BSR. For example, the another BSR may be a BSR that is used to reflect a buffer status of another second logical channel group between the first backhaul node and the second device and that is before the second buffer status report is triggered.

Figure 10:
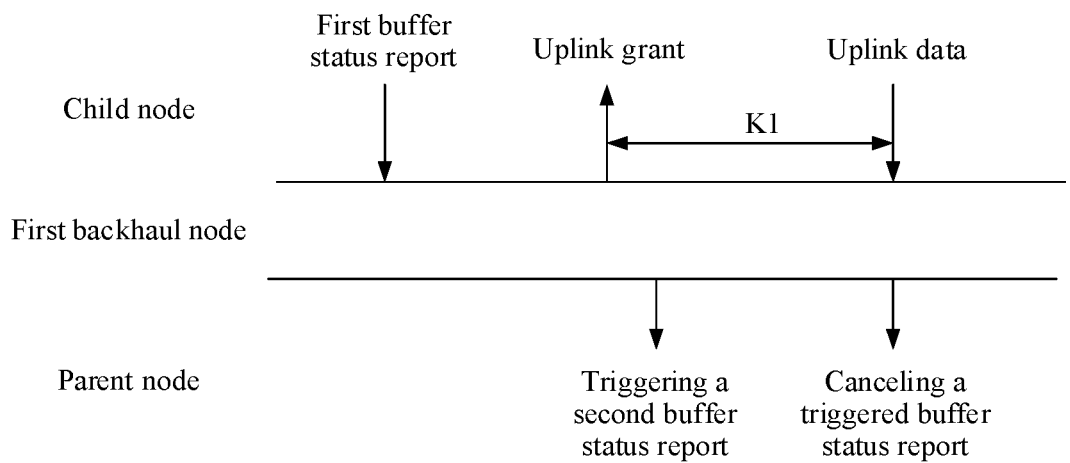
FIG. 10 is a time sequence diagram of a timer according to an embodiment of this application.

When the timer does not expire, as shown in FIG. 10, if there is an available uplink resource, the second buffer status report is sent. Duration of the timer may be configured by a donor node, or may be determined by the first backhaul node. In an embodiment, when the duration of the timer is determined by the first backhaul node, the duration of the timer is PendingTimer=k1-($t_{trigger}$-$t_{UL-grant}$), where k1 is a time interval between a PDCCH (uplink scheduling) and a PUSCH (corresponding uplink data received by the first backhaul node) that are sent by the first backhaul node. PendingTimer indicates the duration of the timer, $t_{trigger}$ indicates a triggering time point, and $t_{UL-grant}$ indicates a time point at which the first backhaul node sends an uplink scheduling grant to the first device.

In this embodiment of this application, when the second buffer status report is triggered, and if the timer expires, it indicates that data reaches the first backhaul node, and the first backhaul node may cancel the triggered second BSR, to avoid resource waste and over-scheduling of the second device caused by continuous reporting of the second BSR.

This embodiment of this application further provides a method for updating a buffer status of a logical channel group. The method includes: When the first backhaul node receives the uplink data and/or the first buffer status report from the first device, the first backhaul node updates uplink buffer statuses of the second logical channel group based on a first logical channel on which the uplink data is located and a data volume on a corresponding first logical channel group and/or the buffer status of the first logical channel group included in the first buffer status report.

In an implementation, the first backhaul node needs to consider, based on a configured first mapping relationship when an MT of the first backhaul node determines a buffer status of each second LCG in a second buffer status report reported to a second device, a data volume of uplink data that is to reach on each first LCG or a data volume that is to reach on each first LCH. Both the first LCG and the first LCH correspond to the DU side of the first backhaul node and the child node (for example, the second backhaul node)/terminal of the first backhaul node.

For each second LCG, when the first backhaul node receives a first buffer status report from the second backhaul node or the terminal, uplink buffer statuses corresponding to one or more first LCGs associated with any second LCG in the first buffer status report needs to be added to the second LCG. For example, an uplink buffer status of a second logical channel group A is used to reflect that an uplink data volume is A. If an uplink data volume corresponding to a first logical channel group A″ associated with the second logical channel group A in the first buffer status report is B, an updated uplink buffer status of the second logical channel group A is used to reflect that the uplink data volume is A+B.

For each second LCG, when the first backhaul node receives uplink data from the child node or the terminal, a data volume corresponding to a first LCG in which the uplink data is located needs to be subtracted from the second LCG (alternatively, when a specific data volume becomes available uplink transmission data on an MT side, a corresponding data volume needs to be subtracted). For example, a current first backhaul node records that 10 M uplink data is to reach on the second LCG. Then, 5 M uplink data is sent on an LCH on a first LCG associated with the second LCG, the 5 M uplink data reaches the first backhaul node, and the first backhaul node records that 5 M uplink data left on the second LCG is to reach the first backhaul node. If the second LCG is associated with one or more first LCGs, a sum of uplink data volumes that reaches the first backhaul node and that is on all LCHs belonging to one or more LCGs is subtracted from an uplink data volume of the second LCG.

If the second buffer status report is reported based on a granularity of each LCH, each child node, or each backhaul node, when the first backhaul node receives a first buffer status report (used to reflect an uplink data volume that is to reach the first backhaul node or an uplink buffer size at the first device) from the child node or the terminal, a data volume corresponding to a data volume of the granularity of the LCH/child node/IAB node needs to be added to the data volume of the granularity of the LCH/child node/IAB node. When the first backhaul node receives uplink data of the child node or the terminal, a data volume corresponding to a data volume of the granularity of the LCH/child node/IAB node needs to be subtracted from the data volume of the granularity of the LCH/child node/IAB node.

In this embodiment of this application, the first backhaul node timely updates, based on uplink buffer statuses of one or more first logical channel groups in the first buffer status report or an uplink data volume that reaches the first backhaul node and that is on an LCH, a buffer status of a second logical channel group associated with an LCH. In this way, it can be ensured that after receiving the second buffer status report, the second device can accurately obtain a buffer status of the first backhaul node, to better schedule an uplink transmission resource for the first backhaul node.

In addition, in another embodiment of this application, a buffer status of each of one or more second logical channel groups may be further determined through the following operations S1 to S3 in this embodiment of this application.

S1: The first backhaul node determines, based on a mapping relationship between each first LCG of a MAC entity corresponding to the first backhaul node and the first device and at least one first LCH belonging to the first LCG, an uplink buffer status of each first LCH obtained after an uplink buffer status of any first LCG included in the first BSR is decomposed into at least one first LCH belonging to the first LCG.

For example, the first backhaul node may implement S1 by using a specific intra-site DU internal algorithm.

Figure 11:
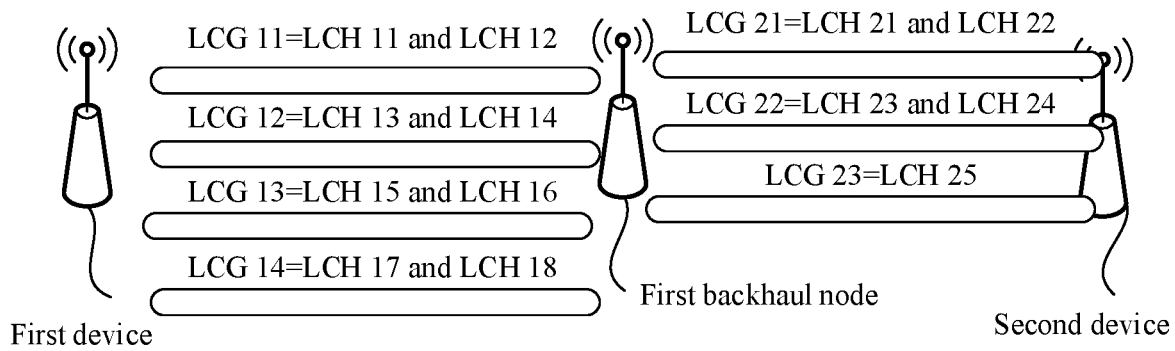
FIG. 11 is a schematic diagram of a mapping relationship between logical channel groups according to an embodiment of this application.

For example, as shown in FIG. 11, the first LCG includes an LCG 11, an LCG 12, an LCG 13, and an LCG 14. At least one first LCH included in the LCG 11 is an LCH 11 and an LCH 12. At least one first LCH included in the LCG 12 is an LCH 13 and an LCH 14. At least one first LCH included in the LCG 13 is an LCH 15 and an LCH 16. At least one first LCH included in the LCG 14 is an LCH 17 and an LCH 18. As shown in FIG. 11, the first backhaul node may decompose an uplink buffer status of the LCG 11 into the LCH 11 and the LCH 12, that is, a sum of uplink buffer statuses respectively corresponding to the LCH 11 and the LCH 12 is equal to the uplink buffer status of the LCG 11. The first backhaul node may decompose an uplink buffer status of the LCG 12 into the LCH 13 and the LCH 14. The first backhaul node may decompose an uplink buffer status of the LCG 13 into LCH 15 and LCH 16. The first backhaul node may decompose an uplink buffer status of the LCG 14 into the LCH 17 and the LCH 18.

If a mapping relationship between any LCG (including the first logical channel group or the second logical channel group) and at least one LCH included in the LCG is configured by a donor gNodeB, the donor gNodeB needs to indicate, for the first backhaul node, a mapping relationship between any one of one or more first logical channel groups and at least one first LCH included in the first logical channel group. If the mapping relationship between any first logical channel group and the at least one first LCH included in the first logical channel group is generated by a DU of the first backhaul node, the first backhaul node knows the mapping relationship between any first logical channel group and the at least one first LCH included in the first logical channel group.

A method in which the first backhaul node decomposes an uplink buffer status of each first LCG in the first buffer status report into at least one first LCH included in each first LCG is implemented internally by the first backhaul node, and a process of the method is not limited. For example, the first backhaul node may evenly decompose the uplink buffer status of the first LCG into each first LCH included in the first LCG.

S2: The first backhaul node determines, based on a mapping relationship between one or more first LCHs and one or more second LCHs, a buffer status of each of the one or more second LCHs of a MAC entity corresponding to the first backhaul node and the second device. A buffer status of any second LCH is used to reflect an uplink data volume that is to reach the second LCH.

In an embodiment, the mapping relationship between the one or more first LCHs and the one or more second LCHs may be a mapping relationship between all first LCHs of the MAC entity corresponding to the first backhaul node and the first device and all second LCHs of the MAC entity corresponding to the first backhaul node and the second device.

The first backhaul node determines, based on the mapping relationship between the one or more first LCHs and the one or more second LCHs and an uplink buffer status of at least one first LCH belonging to each first LCG in the first BSR, a data volume that is to reach on each second LCH.

For example, if there is a mapping relationship between the LCH 11 and an LCH 21, and there is a mapping relationship between the LCH 12 and the LCH 21, a buffer status of the LCH 21 includes an uplink buffer status of the LCH 11 and an uplink buffer status of the LCH 12. If there is a mapping relationship between the LCH 13 and an LCH 22, a buffer status of the LCH 22 includes an uplink buffer status of the LCH 13.

If there is a mapping relationship between the LCH 14 and an LCH 23, and there is a mapping relationship between the LCH 15 and the LCH 23, a buffer status of the LCH 23 includes an uplink buffer status of the LCH 14 and an uplink buffer status of the LCH 15. If the LCH 16 is associated with an LCH 24, an uplink buffer status of the LCH 24 includes an uplink buffer status of the LCH 16.

If the LCH 17 and the LCH 18 are associated with an LCH 25, an uplink buffer status of the LCH 25 includes an uplink buffer status of the LCH 17 and an uplink buffer status of the LCH 18.

Regardless of that an RLC channel/LCH between the first device and the first backhaul node and an RLC channel/LCH between the first backhaul node and the second device are in a many-to-one mapping manner or a one-to-one mapping manner, a buffer status of each second LCH/each second RLC channel that is associated with each first LCH or each first RLC channel and that is between the first backhaul node and the second device may be determined based on a received uplink buffer status of each first LCH or each first RLC channel between the first device and the first backhaul node.

If the buffer status of each LCH/each second RLC channel between the first backhaul node and the second device is determined, in the case of many-to-one mapping, a sum of uplink buffer statuses of a plurality of corresponding first LCHs or first RLC channels between the first device and the first backhaul node may be calculated.

S3: The first backhaul node determines the buffer status of each second logical channel group based on a mapping relationship between the one or more second logical channel groups and at least one second LCH belonging to each of the one or more second logical channel groups. A buffer status of any second logical channel group includes a buffer status of at least one second LCH belonging to the second logical channel group.

For example, if the first backhaul node determines, by performing operation S2, that one or more second LCHs include the LCH 21, the LCH 22, the LCH 23, the LCH 24, and the LCH 25, and if the LCH 21 and the LCH 22 belong to an LCG 21, the LCH 23 and the LCH 24 belong to an LCG 22, and the LCH 25 belongs to an LCG 23, a buffer status of the LCG 21 includes the uplink buffer status of the LCH 21 and the uplink buffer status of the LCH 22. That is, the buffer status of the LCG 21 includes the uplink buffer status of the LCH 11, the uplink buffer status of the LCH 12, and the uplink buffer status of the LCH 13.

A buffer status of the LCG 22 includes the uplink buffer status of the LCH 23 and the uplink buffer status of the LCH 24. That is, the buffer status of the LCG 22 includes the uplink buffer status of the LCH 14, the uplink buffer status of the LCH 15, and the uplink buffer status of the LCH 16.

A buffer status of the LCG 23 includes the uplink buffer status of the LCH 25. That is, the buffer status of the LCG 23 includes the uplink buffer status of the LCH 17 and the uplink buffer status of the LCH 18.

It should be noted that, in this embodiment of this application, after the first backhaul node determines the second buffer status report, to trigger the second device to schedule the uplink transmission resource for the first backhaul node based on the second buffer status report, the first backhaul node needs to report the second buffer status report to the second device. If the second buffer status report reuses an existing BSR MAC CE for reporting, a second LCG that is in the second buffer status report and that is used to report an uplink data volume that is to reach/does not reach the second LCG and a second LCG used to report an uplink data volume locally buffered in the first backhaul node need to be indicated to the second device.

Therefore, the second LCG used to report the uplink data volume that is to reach/does not reach the second LCG and the second LCG used to report the uplink data volume locally buffered in the first backhaul node may be indicated to the second device in the following manners.

Manner 1: Explicit configuration: Two corresponding second LCGs are respectively configured for each second LCH. One second LCG corresponding to each second LCH is used to report a data volume that is to reach/does not reach. Another second LCG corresponding to each LCH is used to report a locally buffered data volume.

Manner 2: Implicit indication: A mapping relationship between a second LCH and a second LCG used to report a locally buffered uplink data volume is configured through normal signaling. In addition, a mapping relationship between a second LCG used to report a data volume that is to reach/does not reach and the second LCG used to report the locally buffered uplink data volume is predefined, and a second LCG corresponding to a data volume that is to reach/does not reach on each second LCH is determined. For example, a second $LCG_i$ is associated with a second $LCG_{(i+N/2)}$, a second $LCG_1$ to a second $LCG_{(N/2)}$ are used to report the locally buffered uplink data volume, and a second $LCG_{(N/2+1)}$ to a second $LCG_{(N)}$ are used to report the data volume that is to reach/does not reach (where compared with the manner 1, costs are reduced). i indicates a number of a second LCG, where $1 \leq i \leq N$, and N indicates a quantity of second LCGs. For details, refer to the foregoing example 1.

In this way, the second device may determine, based on a number of each second LCG in the second buffer status report, whether the LCG is used to report the data volume that is to reach/does not reach, or is used to report the locally buffered data volume, so that the second device performs corresponding resource scheduling.

The foregoing mainly describes the solutions in the embodiments of this application from a perspective of interaction between network elements. It may be understood that to implement the foregoing functions, each network element, for example, the first backhaul node or the donor node, includes corresponding hardware structures and/or software modules for performing the functions. A person skilled in the art should easily be aware that, in combination with units and algorithm operations of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions of each particular application, but it should not be considered that the implementation goes beyond the scope of this application.

In the embodiments of this application, the first backhaul node and the donor node may be divided into functional units based on the foregoing method examples. For example, each functional unit may be obtained through division based on each corresponding function, or two or more functions may be integrated into one processing unit. The integrated unit may be implemented in a form of hardware, or may be implemented in a form of a software functional unit. It should be noted that, in the embodiments of this application, division into the units is exemplary, and is merely a logical function division. In actual implementation, another division manner may be used.

The foregoing describes the methods in the embodiments of this application with reference to FIG. 6 to FIG. 11. The following describes the first backhaul node and the donor node that perform the foregoing methods and that are provided in the embodiments of this application. A person skilled in the art may understand that the method and the apparatus may be mutually combined and referenced, and the first backhaul node and the donor node provided in the embodiments of this application may perform operations performed by the first backhaul node and the donor node in the foregoing methods.

An example in which each functional module is obtained through division based on each corresponding function is used below for description.

Figure 12:
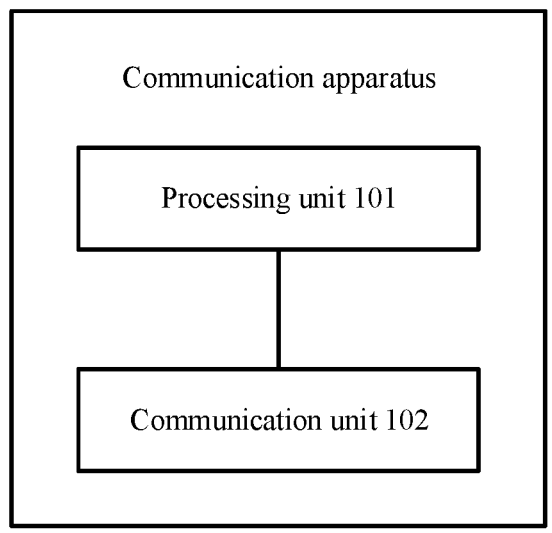
FIG. 12 is a schematic diagram of a structure of a communication apparatus according to an embodiment of this application.

When an integrated unit is used, FIG. 12 shows a communication apparatus in the foregoing embodiments. The communication apparatus may include a communication unit 102 and a processing unit 101.

Example 2-1: The communication apparatus is a first backhaul node, or is a chip applied to the first backhaul node. In this case, the communication unit 102 is configured to support the communication apparatus in performing operation 601 in FIG. 6 performed by the first backhaul node in the foregoing embodiment. The processing unit 101 supports the communication apparatus in performing operation 602 in FIG. 6 performed by the first backhaul node in the foregoing embodiment.

In a possible embodiment, the communication unit 102 is further configured to support the communication apparatus in performing operation 603 and operation 604 that are performed by the first backhaul node in the foregoing embodiment.

Example 2-2: The communication apparatus is a donor node, or is a chip applied to the donor node. In this case, the communication unit 102 is configured to support the communication apparatus in performing operation 702 in FIG. 7 performed by the donor node in the foregoing embodiment. The processing unit 101 supports the communication apparatus in performing operation 701 in FIG. 7 performed by the donor node in the foregoing embodiment.

Example 2-3: The communication apparatus is a first backhaul node, or is a chip applied to the first backhaul node. In this case, the communication unit 102 is configured to support the communication apparatus in performing operation 703 in FIG. 7 performed by the first backhaul node in the foregoing embodiment. The processing unit 101 supports the communication apparatus in performing operation 704 in FIG. 7 performed by the first backhaul node in the foregoing embodiment.

In a possible embodiment, the processing unit 101 is further configured to support the communication apparatus in performing operation 705 performed by the first backhaul node in the foregoing embodiment.

Example 2-4: The communication apparatus is a first backhaul node, or is a chip applied to the first backhaul node. In this case, the processing unit 101 supports the communication apparatus in performing operation 801 and operation 802 in FIG. 8 that are performed by the first backhaul node in the foregoing embodiment.

It may be understood that, in example 2-4, the communication apparatus may not include the communication unit 102, that is, the communication unit 102 is optional.

Example 2-5: The communication apparatus is a first backhaul node, or is a chip applied to the first backhaul node. In this case, the processing unit 101 supports the communication apparatus in performing operation 901, operation 902, and operation 903 in FIG. 9 that are performed by the first backhaul node in the foregoing embodiment.

Example 2-5: The communication apparatus is a first backhaul node, or is a chip applied to the first backhaul node. In this case, the processing unit 101 supports the communication apparatus in performing the operation that is of updating the uplink buffer status of the second logical channel group that is performed by the first backhaul node in the foregoing embodiment.

It may be understood that, in example 2-6, the communication apparatus may not include the communication unit 102, that is, the communication unit 102 is optional.

Figure 13:
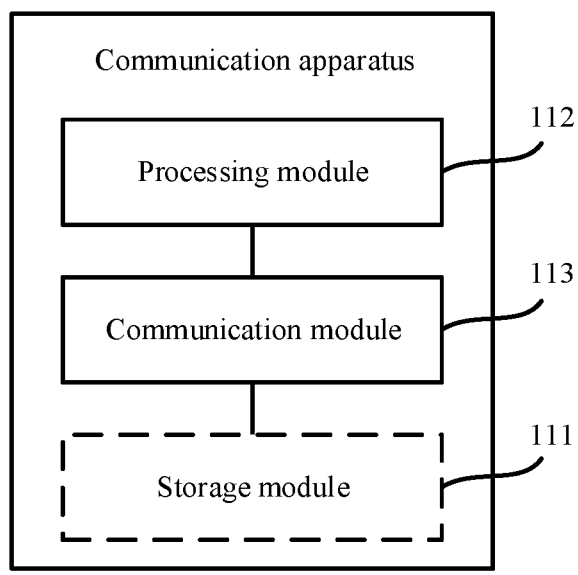
FIG. 13 is a schematic diagram of a structure of another communication apparatus according to an embodiment of this application.

When an integrated unit is used, FIG. 13 is a schematic diagram of a possible logical structure of the communication apparatus in the foregoing embodiment. The communication apparatus includes a processing module 112 and a communication module 113. The processing module 112 is configured to control and manage actions of the communication apparatus. For example, the processing module 112 is configured to perform an operation of information/data processing performed by the communication apparatus. The communication module 113 is configured to support the communication apparatus in performing an operation of sending or receiving information/data.

In a possible embodiment, the communication apparatus may further include a storage module 111, configured to store program code and data of the communication apparatus.

Example 3-1: The communication apparatus is a first backhaul node, or is a chip applied to the first backhaul node. In this case, the communication module 113 is configured to support the communication apparatus in performing operation 601 in FIG. 6 performed by the first backhaul node in the foregoing embodiment. The processing module 112 supports the communication apparatus in performing operation 602 in FIG. 6 performed by the first backhaul node in the foregoing embodiment.

In a possible embodiment, the communication module 113 is further configured to support the communication apparatus in performing operation 603 and operation 604 that are performed by the first backhaul node in the foregoing embodiment.

Example 3-2: The communication apparatus is a donor node, or is a chip applied to the donor node. In this case, the communication module 113 is configured to support the communication apparatus in performing operation 702 in FIG. 7 performed by the donor node in the foregoing embodiment. The processing module 112 supports the communication apparatus in performing operation 701 in FIG. 7 performed by the donor node in the foregoing embodiment.

Example 3-3: The communication apparatus is a first backhaul node, or is a chip applied to the first backhaul node. In this case, the communication module 113 is configured to support the communication apparatus in performing operation 703 in FIG. 7 performed by the first backhaul node in the foregoing embodiment. The processing module 112 supports the communication apparatus in performing operation 704 in FIG. 7 performed by the first backhaul node in the foregoing embodiment.

In a possible embodiment, the processing module 112 is further configured to support the communication apparatus in performing operation 705 performed by the first backhaul node in the foregoing embodiment.

Example 3-4: The communication apparatus is a first backhaul node, or is a chip applied to the first backhaul node. In this case, the processing module 112 supports the communication apparatus in performing operation 801 and operation 802 in FIG. 8 that are performed by the first backhaul node in the foregoing embodiment.

It may be understood that, in example 3-4, the communication apparatus may not include the communication module 113, that is, the communication module 113 is optional.

Example 3-5: The communication apparatus is a first backhaul node, or is a chip applied to the first backhaul node. In this case, the processing module 112 supports the communication apparatus in performing operation 901, operation 902, and operation 903 in FIG. 9 that are performed by the first backhaul node in the foregoing embodiment.

It may be understood that, in example 3-5, the communication apparatus may not include the communication module 113, that is, the communication module 113 is optional.

Example 3-6: The communication apparatus is a first backhaul node, or is a chip applied to the first backhaul node. In this case, the processing module 112 supports the communication apparatus in performing the operation that is of updating the uplink buffer status of the second logical channel group that is performed by the first backhaul node in the foregoing embodiment.

It may be understood that, in example 3-6, the communication apparatus may not include the communication module 113, that is, the communication module 113 is optional.

The processing module 112 may be a processor or a controller, for example, may be a central processing unit, a general-purpose processor, a digital signal processor, an application-specific integrated circuit, a field programmable gate array or another programmable logic device, a transistor logic device, a hardware component, or any combination thereof. The processing module 112 may implement or execute various example logical blocks, modules, and circuits described with reference to content disclosed in the present invention. Alternatively, the processor may be a combination of processors implementing a computing function, for example, a combination of one or more microprocessors, or a combination of a digital signal processor and a microprocessor. The communication module 113 may be a transceiver, a transceiver circuit, a communication interface, or the like. The storage module 111 may be a memory.

When the processing module 112 is a processor 41 or a processor 45, the communication module 113 is a transceiver 43, and the storage module 111 is a memory 42, the communication apparatus in this application may be the communication device shown in FIG. 4.

Figure 14:
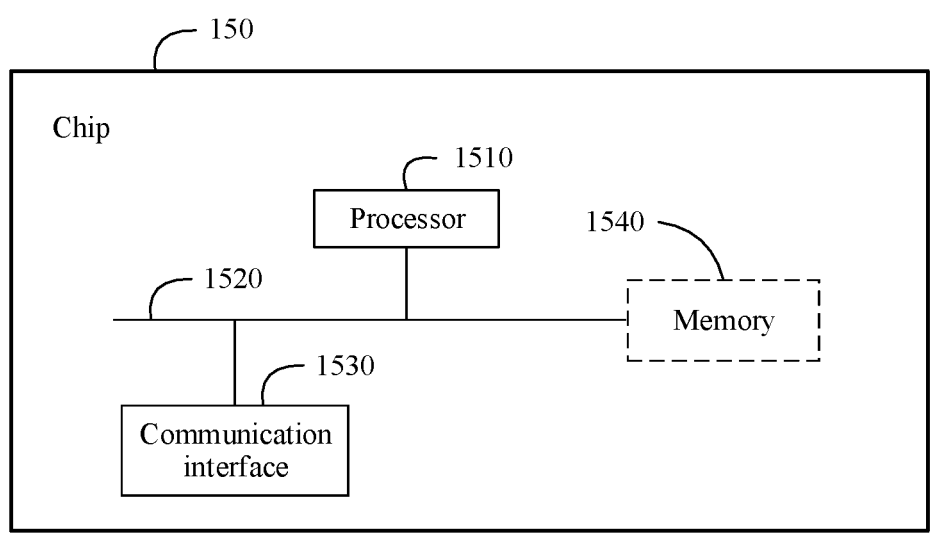
FIG. 14 is a schematic diagram of a structure of a chip according to an embodiment of this application.

FIG. 14 is a schematic diagram of a structure of a chip 150 according to an embodiment of this application. The chip 150 includes one or more (including two) processors 1510 and a communication interface 1530.

In an embodiment, the chip 150 further includes a memory 1540. The memory 1540 may include a read-only memory and a random access memory, and provide operation instructions and data for the processor 1510. A part of the memory 1540 may further include a non-volatile random access memory (NVRAM).

In some implementations, the memory 1540 stores the following elements: an executable module or a data structure, a subset thereof, or an extended set thereof.

In this embodiment of this application, a corresponding operation is performed by invoking the operation instructions (where the operation instructions may be stored in an operating system) stored in the memory 1540.

In an embodiment, a first backhaul node and a donor node use a similar chip structure, and different apparatuses may use different chips to implement respective functions.

The processor 1510 controls a processing operation of any one of the first backhaul node and the donor node. The processor 1510 may also be referred to as a central processing unit (CPU).

The memory 1540 may include a read-only memory and a random access memory, and provide instructions and data for the processor 1510. A part of the memory 1540 may further include a non-volatile random access memory (NVRAM). For example, in an application, the memory 1540, the communication interface 1530, and the memory 1540 are coupled together through a bus system 1520. The bus system 1520 may further include a power bus, a control bus, a status signal bus, and the like in addition to a data bus. However, for clear description, various types of buses in FIG. 14 are marked as the bus system 1520.

The methods disclosed in the foregoing embodiments of this application may be applied to the processor 1510, or may be implemented by the processor 1510. The processor 1510 may be an integrated circuit chip and has a signal processing capability. In an implementation process, operations in the foregoing methods may be implemented by using a hardware integrated logical circuit in the processor 1510, or by using instructions in a form of software. The processor 1510 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor 1510 may implement or perform the methods, the operations, and logical block diagrams that are disclosed in the embodiments of this application. The general-purpose processor may be a microprocessor, or the processor may be any conventional processor or the like. Operations of the methods disclosed with reference to the embodiments of this application may be directly performed and completed by using a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 1540, and the processor 1510 reads information in the memory 1540 and completes the operations in the foregoing methods in combination with hardware of the processor 1510.

In an embodiment, the communication interface 1530 is configured to perform the receiving and sending operations of the first backhaul node and the donor node in the embodiments shown in FIG. 6 to FIG. 11. The processor 1510 is configured to perform the processing operations of the first backhaul node and the donor node in the embodiments shown in FIG. 6 to FIG. 14.

The foregoing communication unit may be an interface circuit, a communication interface, or a transceiver of the apparatus, and is configured to receive a signal from another apparatus. For example, when the apparatus is implemented as a chip, the communication unit is an interface circuit or a communication interface that is of the chip and that is configured to receive a signal from another chip or apparatus or send a signal.

In the foregoing embodiment, the instructions that are stored in the memory and that are to be executed by the processor may be implemented in a form of a computer program product. The computer program product may be written into the memory in advance, or may be downloaded and installed in the memory in a form of software.

The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid-state drive, SSD), or the like.

According to one aspect, a computer-readable storage medium is provided. The computer-readable storage medium stores instructions. When the instructions are run, the first backhaul node or the chip applied to the first backhaul node is enabled to perform operation 601, operation 602, operation 603, and operation 604 in the embodiments.

According to one aspect, a computer-readable storage medium is provided. The computer-readable storage medium stores instructions. When the instructions are run, the donor node or the chip applied to the donor node is enabled to perform operation 701 and operation 702 in the embodiments.

According to one aspect, a computer-readable storage medium is provided. The computer-readable storage medium stores instructions. When the instructions are run, the first backhaul node or the chip applied to the first backhaul node is enabled to perform operation 703, operation 704, and operation 705 in the embodiments.

According to one aspect, a computer-readable storage medium is provided. The computer-readable storage medium stores instructions. When the instructions are run, the first backhaul node or the chip applied to the first backhaul node is enabled to perform operation 801 and operation 802 in the embodiments.

According to one aspect, a computer-readable storage medium is provided. The computer-readable storage medium stores instructions. When the instructions are run, the first backhaul node or the chip applied to the first backhaul node is enabled to perform operation 901, operation 902, and operation 903 in the embodiments.

According to one aspect, a computer-readable storage medium is provided. The computer-readable storage medium stores instructions. When the instructions are run, the first backhaul node or the chip applied to the first backhaul node is enabled to perform the operation of updating the uplink buffer status of the second logical channel group in the embodiments.

The foregoing readable storage medium may include any medium that can store program code, such as a USB flash drive, a removable hard disk, a read-only memory, a random access memory, a magnetic disk, or an optical disc.

According to one aspect, a computer program product including instructions is provided. The computer program product stores the instructions. When the instructions are run, the first backhaul node or the chip applied to the first backhaul node is enabled to perform operation 601, operation 602, operation 603, and operation 604 in the embodiments.

According to another aspect, a computer program product including instructions is provided. The computer program product stores the instructions. When the instructions are run, the donor node or the chip applied to the donor node is enabled to perform operation 701 and operation 702 in the embodiments.

According to still another aspect, a computer program product including instructions is provided. The computer program product stores the instructions. When the instructions are run, the first backhaul node or the chip applied to the first backhaul node is enabled to perform operation 703, operation 704, and operation 705 in the embodiments.

According to yet another aspect, a computer program product including instructions is provided. The computer program product stores the instructions. When the instructions are run, the first backhaul node or the chip applied to the first backhaul node is enabled to perform operation 801 and operation 802 in the embodiments.

According to still yet another aspect, a computer program product including instructions is provided. The computer program product stores the instructions. When the instructions are run, the first backhaul node or the chip applied to the first backhaul node is enabled to perform operation 901, operation 902, and operation 903 in the embodiments.

According to a further aspect, a computer program product including instructions is provided. The computer program product stores the instructions. When the instructions are run, the first backhaul node or the chip applied to the first backhaul node is enabled to perform the operation of updating the uplink buffer status of the second logical channel group in the embodiments.

According to one aspect, a chip is provided. The chip is applied to the first backhaul node. The chip includes at least one processor and a communication interface, where the communication interface is coupled to the at least one processor, and the processor is configured to run instructions, to perform operation 601, operation 602, operation 603, and operation 604 in the embodiments.

According to another aspect, a chip is provided. The chip is applied to the donor node. The chip includes at least one processor and a communication interface, where the communication interface is coupled to the at least one processor, and the processor is configured to run instructions, to perform operation 701 and operation 702 in the embodiments.

According to one aspect, a chip is provided. The chip is applied to the first backhaul node. The chip includes at least one processor and a communication interface, where the communication interface is coupled to the at least one processor, and the processor is configured to run instructions, to perform operation 703, operation 704, and operation 705 in the embodiments.

According to another aspect, a chip is provided. The chip is applied to the first backhaul node. The chip includes at least one processor and a communication interface, where the communication interface is coupled to the at least one processor, and the processor is configured to run instructions, to perform operation 801 and operation 802 in the embodiments.

According to still another aspect, a chip is provided. The chip is applied to the first backhaul node. The chip includes at least one processor and a communication interface, where the communication interface is coupled to the at least one processor, and the processor is configured to run instructions, to perform operation 901, operation 902, and operation 903 in the embodiments.

According to yet another aspect, a chip is provided. The chip is applied to the first backhaul node. The chip includes at least one processor and a communication interface, where the communication interface is coupled to the at least one processor, and the processor is configured to run instructions, to perform the operation in which the first backhaul node updates the uplink buffer status of the second logical channel group in the embodiments.

All or some of the foregoing embodiments may be implemented by software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments herein, in a process of implementing this application that claims protection, a person skilled in the art may understand and implement another variation of the disclosed embodiments by viewing the accompanying drawings, disclosed content, and the appended claims. In the claims, "comprising" does not exclude another component or another operation, and "a" or "one" does not exclude a case of a plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely example description of this application defined by the appended claims, and is considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method of determining an association between logical channel groups, comprising:
   receiving, by a first backhaul node, a first buffer status report from a first device, wherein the first buffer status report is used to determine uplink buffer statuses of one or more first logical channel groups of a media access control (MAC) entity corresponding to the first backhaul node and the first device, the first device is a child node of the first backhaul node, and the first device is a terminal or a second backhaul node;
   determining, by the first backhaul node based on the one or more first logical channel groups and a first mapping relationship, one or more second logical channel groups associated with the one or more first logical channel groups, wherein a second device is a parent node of the first backhaul node, the second device is a donor node or a third backhaul node, and the first mapping relationship comprises: a mapping relationship between the one or more first logical channel groups and the one or more second logical channel groups of a MAC entity corresponding to the first backhaul node and the second device; and
   determining, by the first backhaul node based on the uplink buffer statuses of the one or more first logical channel groups and the first mapping relationship, a second buffer status report sent by the first backhaul node to the second device, wherein the first backhaul node applies for an uplink transmission resource from the second device in advance based on the second buffer status report.

2. The method according to claim 1, further comprising:
   receiving, by the first backhaul node, a first configuration message from the donor node, wherein the first configuration message comprises at least the first mapping relationship.

3. The method according to claim 1,
   wherein the second buffer status report comprises buffer statuses of the second logical channel groups associated with the one or more first logical channel groups; and
   wherein the second buffer status report is used to report, to the second device, an uplink buffer status that is on the one or more second logical channel groups and that does not reach the first backhaul node.

4. The method according to claim 3, further comprising:
   determining, by the first backhaul node, a scheduling request (SR) configuration corresponding to the second buffer status report.

5. The method according to claim 4, further comprising:
   determining, by the first backhaul node, a logical channel (LCH) associated with the second buffer status report; and
   determining, by the first backhaul node, an SR configuration associated with the LCH, wherein
   the SR configuration corresponding to the second buffer status report is the SR configuration associated with the LCH.

6. The method according to claim 5, wherein determining the LCH associated with the second buffer status report comprises:
   predefining, in a protocol, or preconfiguring the LCH associated with the second buffer status report; or
   determining, by the first backhaul node based on priorities of one or more LCHs, the LCH associated with the second buffer status report.

7. The method according to claim 4, wherein the SR configuration corresponding to the second buffer status report is predefined in a protocol.

8. A method of determining an association between logical channel groups, comprising:
   determining, by a donor node, a first mapping relationship that comprises: a mapping relationship between one or more first logical channel groups of a media access control (MAC) entity corresponding to a first backhaul node and a first device, and one or more second logical channel groups of a MAC entity corresponding to the first backhaul node and a second device, wherein the first device is a child node of the first backhaul node, and the first device is a terminal or a second backhaul node; and the second device is a parent node of the first backhaul node, and the second device is the donor node or a third backhaul node;
   receiving, by the donor node, a second buffer status report from the first backhaul node, wherein the first backhaul node applies for an uplink transmission resource from the second device in advance based on the second buffer status report; and
   sending, by the donor node, a first configuration message to the first backhaul node, wherein the first configuration message comprises the first mapping relationship.

9. The method according to claim 8,
wherein the second buffer status report is used to report, to the donor node, an uplink buffer status that is on the one or more second logical channel groups and that does not reach the first backhaul node.

10. The method according to claim 9, wherein the second buffer status report carries indication information; and
the indication information is used to indicate that the second buffer status report comes from the second backhaul node.

11. A first backhaul node, comprising:
a processor; and
a memory coupled to the processor to store instructions, which when executed by the processor, cause the first backhaul node to perform operations, the operations comprising:
receiving a first buffer status report from a first device, wherein the first buffer status report is used to determine uplink buffer statuses of one or more first logical channel groups of a media access control (MAC) entity corresponding to the first backhaul node and the first device, the first device is a child node of the first backhaul node, and the first device is a terminal or a second backhaul node;
determining, based on the one or more first logical channel groups and a first mapping relationship, one or more second logical channel groups associated with the one or more first logical channel groups, wherein a second device is a parent node of the first backhaul node, the second device is a donor node or a third backhaul node, and the first mapping relationship comprises: a mapping relationship between the one or more first logical channel groups and the one or more second logical channel groups of a MAC entity corresponding to the first backhaul node and the second device; and
determining, by the first backhaul node based on the uplink buffer statuses of the one or more first logical channel groups and the first mapping relationship, a second buffer status report sent by the first backhaul node to the second device, wherein the first backhaul node applies for an uplink transmission resource from the second device in advance based on the second buffer status report.

12. The first backhaul node according to claim 11, wherein the operations further comprise:
receiving a first configuration message from the donor node, wherein the first configuration message comprises at least the first mapping relationship.

13. The first backhaul node according to claim 11,
wherein the second buffer status report comprises buffer statuses of the one or more second logical channel groups associated with the one or more first logical channel groups; and
the second buffer status report is used to report, to the second device, an uplink buffer status that is on the one or more second logical channel groups and that does not reach the first backhaul node.

14. The first backhaul node according to claim 13, wherein the operations further comprise:

determining a scheduling request (SR) configuration corresponding to the second buffer status report.

15. The first backhaul node according to claim 14, wherein the operations further comprise:
determining a logical channel (LCH) associated with the second buffer status report; and
determining an SR configuration associated with the LCH, wherein
the SR configuration corresponding to the second buffer status report is the SR configuration associated with the LCH.

16. The first backhaul node according to claim 15, wherein determining the LCH associated with the second buffer status report comprises:
predefining, in a protocol, or preconfiguring the LCH associated with the second buffer status report; or
determining, based on priorities of one or more LCHs, the LCH associated with the second buffer status report.

17. The first backhaul node according to claim 14, wherein the SR configuration corresponding to the second buffer status report is predefined in a protocol.

18. A donor node, comprising:
a processor; and
a memory coupled to the memory to store instructions; which when executed by the processor, cause the donor node to perform operations, the operations comprising:
determining a first mapping relationship that comprises: a mapping relationship between one or more first logical channel groups of a media access control (MAC) entity corresponding to a first backhaul node and a first device, and one or more second logical channel groups of a MAC entity corresponding to the first backhaul node and a second device, wherein the first device is a child node of the first backhaul node, and the first device is a terminal or a second backhaul node; and the second device is a parent node of the first backhaul node, and the second device is the donor node or a third backhaul node;
receiving a second buffer status report from the first backhaul node, wherein the first backhaul node applies for an uplink transmission resource from the second device in advance based on the second buffer status report; and
sending a first configuration message to the first backhaul node, wherein the first configuration message comprises the first mapping relationship.

19. The donor node according to claim 18,
wherein the second buffer status report is used to report, to the donor node, an uplink buffer status that is on the one or more second logical channel groups and that does not reach the first backhaul node.

20. The donor node according to claim 19, wherein the second buffer status report carries indication information; and
the indication information is used to indicate that the second buffer status report comes from the second backhaul node.

* * * * *